Dec. 29, 1964    K. A. SUMIDA ETAL    3,163,107

DATA REGISTER WITH PLURAL RECORDING MEANS

Filed Aug. 22, 1961    10 Sheets-Sheet 1

INVENTORS:
Kunio A. Sumida
Robert C. Sadler

By Smyth, Roston & Pavitt
Attorneys

DATA REGISTER WITH PLURAL RECORDING MEANS
Filed Aug. 22, 1961
10 Sheets-Sheet 2
Fig. 2 (L.H. Card Shown)
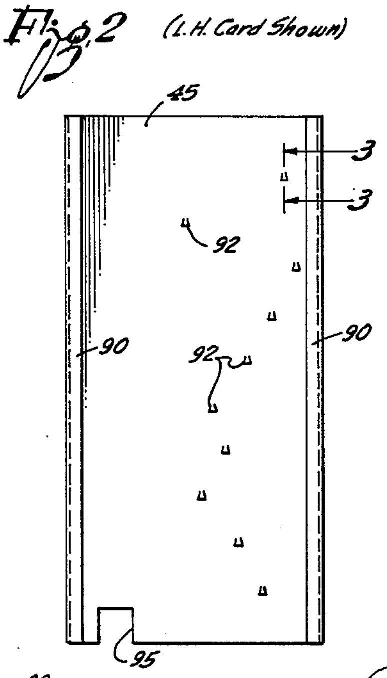
Fig. 3
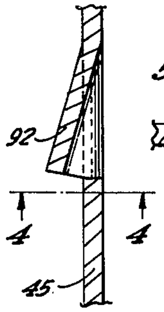
Fig. 4
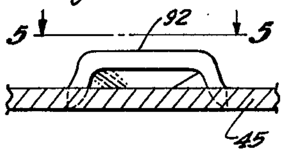
Fig. 5
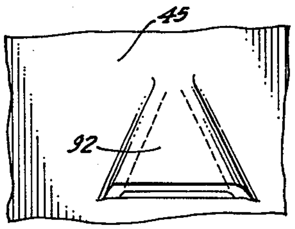
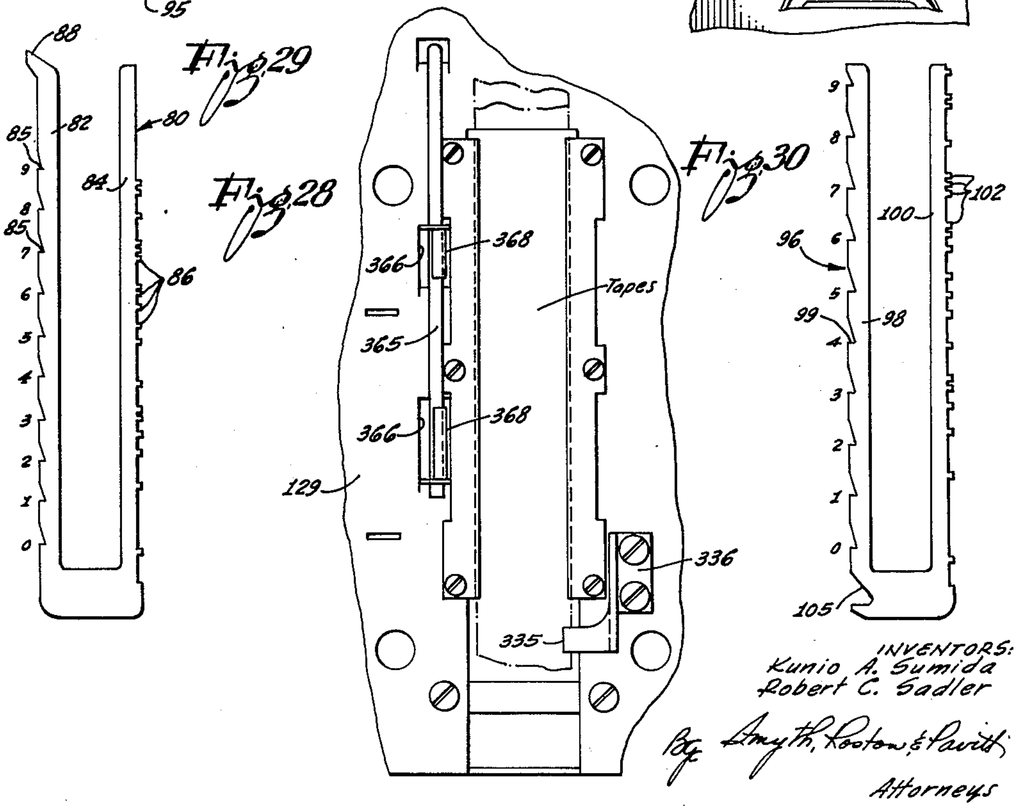
Fig. 29, Fig. 28, Fig. 30
INVENTORS:
Kunio A. Sumida
Robert C. Sadler
By Smyth, Roston & Pavitt
Attorneys

DATA REGISTER WITH PLURAL RECORDING MEANS

INVENTORS:
Kunio A. Sumida
Robert C. Sadler
By Smyth, Roston & Pavitt
Attorneys

INVENTORS:
Kunio A. Sumida
Robert C. Sadler
By Smyth, Roston & Pavitt
Attorneys

INVENTORS:
Kunio A. Sumida
Robert C. Sadler
By Smyth, Roston & Pavitt
Attorneys

DATA REGISTER WITH PLURAL RECORDING MEANS

Filed Aug. 22, 1961 10 Sheets-Sheet 6

INVENTORS:
Kunio A. Sumida
Robert C. Sadler
By Smyth, Roston & Pavitt
Attorneys

DATA REGISTER WITH PLURAL RECORDING MEANS

INVENTORS: Kunio A. Sumida
Robert C. Sadler

By Smyth, Roston & Pavitt
Attorneys

Dec. 29, 1964 K. A. SUMIDA ETAL 3,163,107

DATA REGISTER WITH PLURAL RECORDING MEANS

Filed Aug. 22, 1961 10 Sheets-Sheet 8

INVENTORS:
Kunio A. Sumida
Robert C. Sadler

By Smyth, Roston & Pavitt
Attorneys

DATA REGISTER WITH PLURAL RECORDING MEANS

Filed Aug. 22, 1961 10 Sheets-Sheet 9

INVENTORS:
Kunio A. Sumida
Robert C. Sadler

By Smyth, Roston & Pavitt
Attorneys

DATA REGISTER WITH PLURAL RECORDING MEANS

Filed Aug. 22, 1961 10 Sheets-Sheet 10

INVENTORS:
Kunio A. Sumida
Robert C. Sadler

By Smyth, Roston & Pavitt
Attorneys

United States Patent Office 3,163,107
Patented Dec. 29, 1964

3,163,107
DATA REGISTER WITH PLURAL RECORDING MEANS

Kunio A. Sumida, Los Angeles, and Robert C. Sadler, Culver City, Calif., assignors, by mesne assignments, to Biagio F. Ambrosio, Tarzana, Calif.

Filed Aug. 22, 1961, Ser. No. 133,122
37 Claims. (Cl. 101—90)

This invention relates to a portable hand-operated register for mechanically recording data that is to be subsequently processed by a computer. Since the register is portable for use wherever needed, it may be aptly described as a "point of action" recorder. It may be used for a wide range of purposes, including various types of transactions and the taking of inventories.

For the purpose of the present disclosure and to illustrate the principles involved, the register will be described as adapted for recording meter readings for use in billing the customers of a public utility. The register may be easily carried by a field man since the preferred embodiment of the invention is relatively small, 10½" x 8¼" x 3½" and is of the relatively light weight of approximately six pounds. The description of this particular embodiment will provide adequate guidance for those skilled in the art who may have occasion to design a similar data register for other specific purposes.

As adapted for recording meter readings, the register uses a five-bit code to write or print thirty information digits for each transaction. Ten digits are supplied by inserting a card carried by the field man; ten digits are supplied by inserting a card that is tied to the customer's meter; and ten digits are supplied by the field man manipulating finger bars or keys to record the current reading of the customer's meter. In addition, an initial digit is provided to signal the start of the input of data and a final digit is added to indicate the end of the data for control of the reading function of the computer.

After the data has been supplied to the portable register by the two cards and by finger manipulation on the part of the field man, the register is manually operated to write the data on a tape that will be subsequently fed to the computer.

Various types of tape and recording procedures may be used. In the initial practice of the invention, magnetic recording is employed and the data is written on the tape by means of a suitable ferromagnetic pigment. In the presently preferred practice of the invention, two tapes are employed, one being the record tape and the other being a transfer tape which is used in the same manner as carbon paper to apply the data to the record tape.

The invention is characterized by the incorporation of various safeguards to eliminate errors and to avoid malfunctioning by inadvertent incorrect manual manipulation. One safeguard is that the finger keys have exposed indicia for direct visual check of the data introduced by manipulation of the keys. Another safeguard is means to prevent the performance of the recording or writing operation unless both of the data cards are fully inserted. Another safeguard makes it impossible to perform the writing function unless additional data has been introduced by manipulation of the finger keys by the operator. Another safeguard is means which prevents an incomplete writing operation. Once a writing operation is started, it must be completed to make a subsequent cycle of operation possible. A still further safeguard is means to restore the register mechanism completely to its starting state in response to the completion of the writing operation, thereby preventing the reprinting of data or the carryover from one transaction to another.

It is readily apparent that a device of this character saves time and expense in addition to being conducive to high accuracy. The operator need not take time to write out data manually and there is no possibility of illegible data. There can be no mistake about the identity of the field man and no error about the identity of the customer's meter. A single roll of tape will record 500 meter readings and the tape can transfer the data for the 500 transactions to the computer storage or memory bank in 20 seconds or less.

It may be readily appreciated that numerous problems arise and must be solved in incorporating the basic concept of the invention in a compact and efficient portable device. In general, the various problems are solved by using a bank of longitudinally slidable code members with binary bit type thereon; by longitudinally advancing the code members to selected positions in accord with the data to be recorded; by routing the recording tape and associated transfer tape along a printing or writing zone extending transversely of the code members; and by moving a printing roller across the pair of tapes in the printing zone to press the pair of tapes against the binary bit type to impress the data on the record tape. As will be explained, various interlocks and latch arrangements are incorporated to provide the above mentioned automatic safeguards.

The various features and advantages of the invention may be fully understood by referring to the following detailed description and the accompanying drawings.

In the drawings, which are to be regarded as merely illustrative:

FIG. 2 is a face view of one of the two metal data cards for insertion into the register;

FIG. 3 is an enlarged fragmentary section along the line 3—3 of FIG. 2 showing how a data tooth may be formed by lancing and offsetting a portion of the card;

FIG. 4 is a view of the data tooth as seen along the line 4—4 of FIG. 3;

FIG. 5 is an enlarged portion of the card as viewed along the line 5—5 of FIG. 4 showing the same tooth in front elevation;

Figure 6:
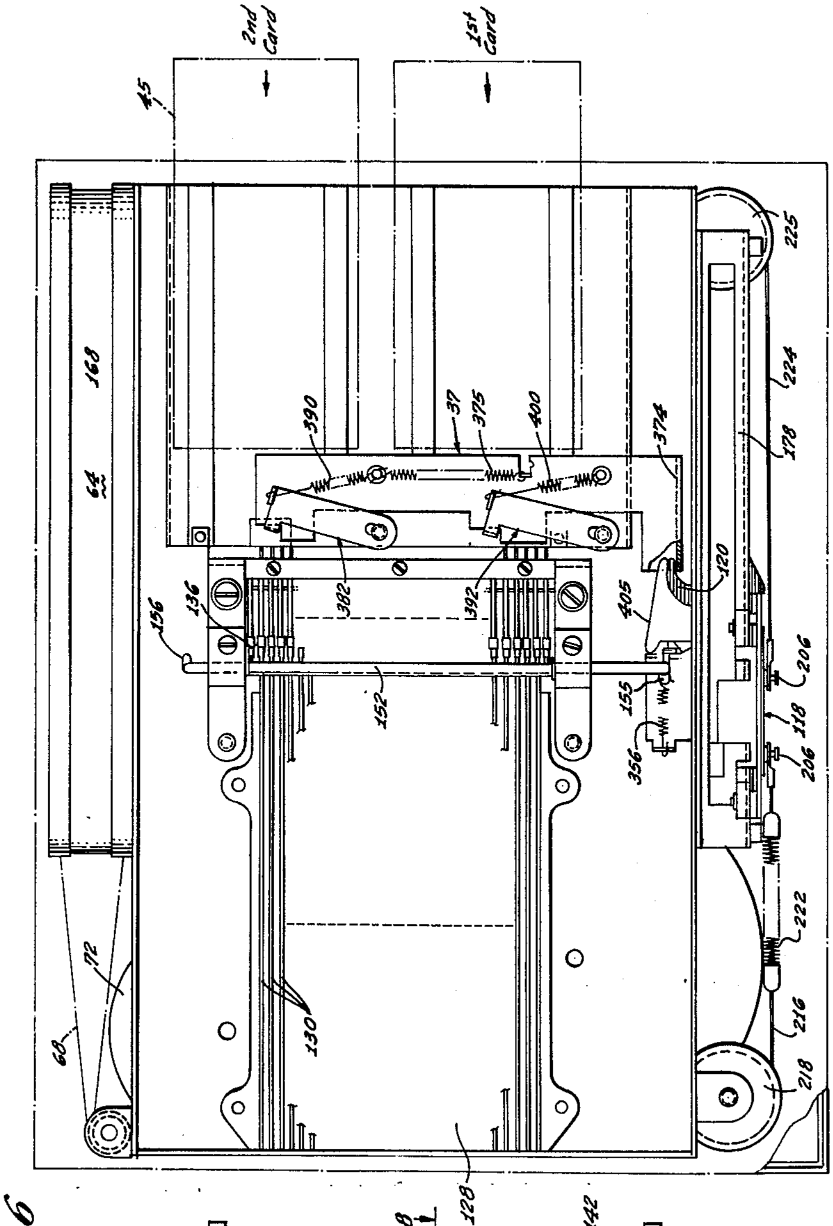
Figure 8:
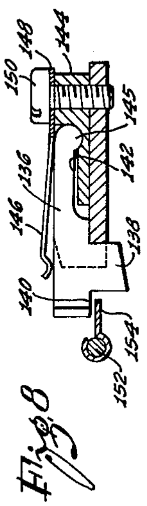
Figure 7:
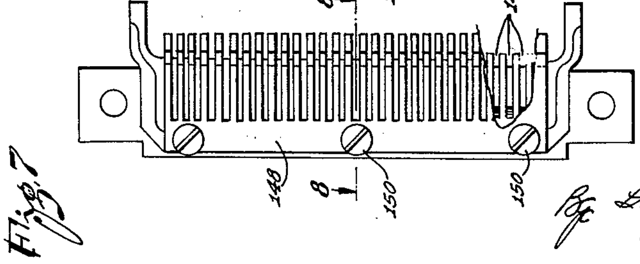
Figures 9, 10, 11:
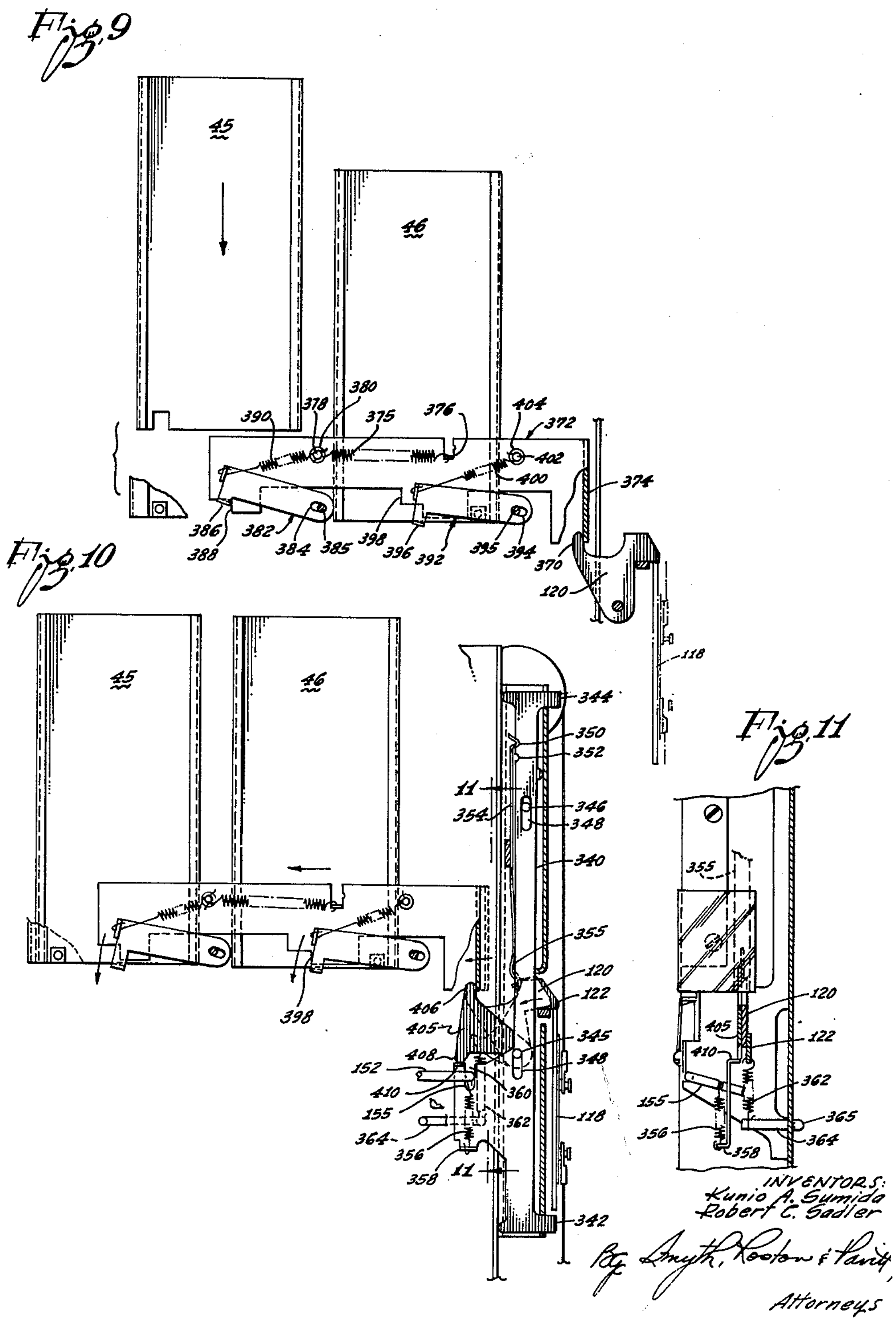
Figure 12:
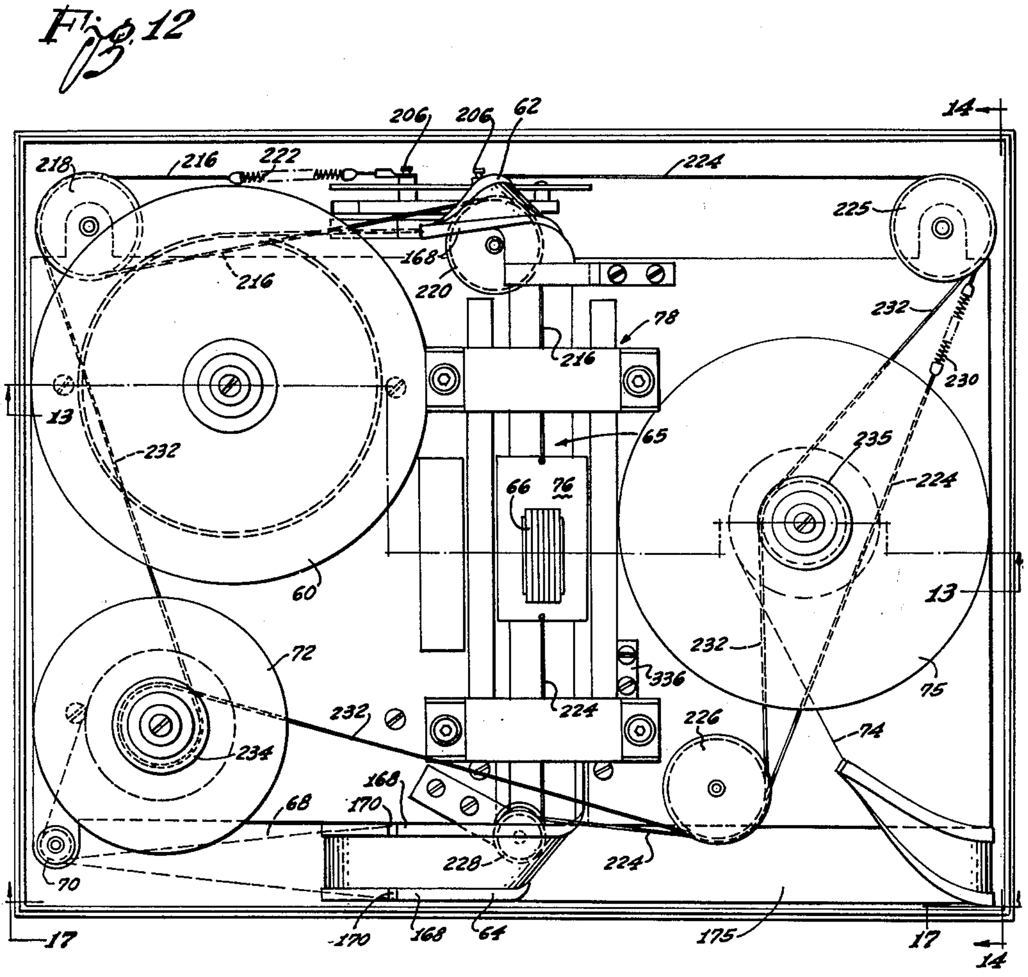
Figure 31:
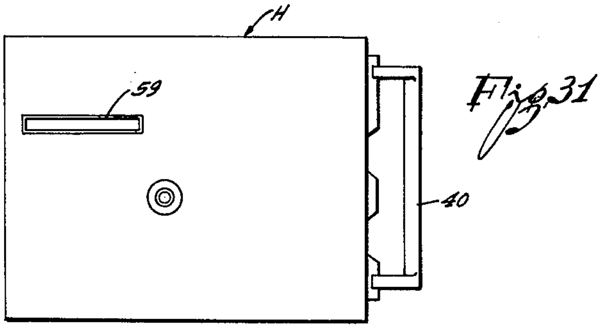
Figure 13:
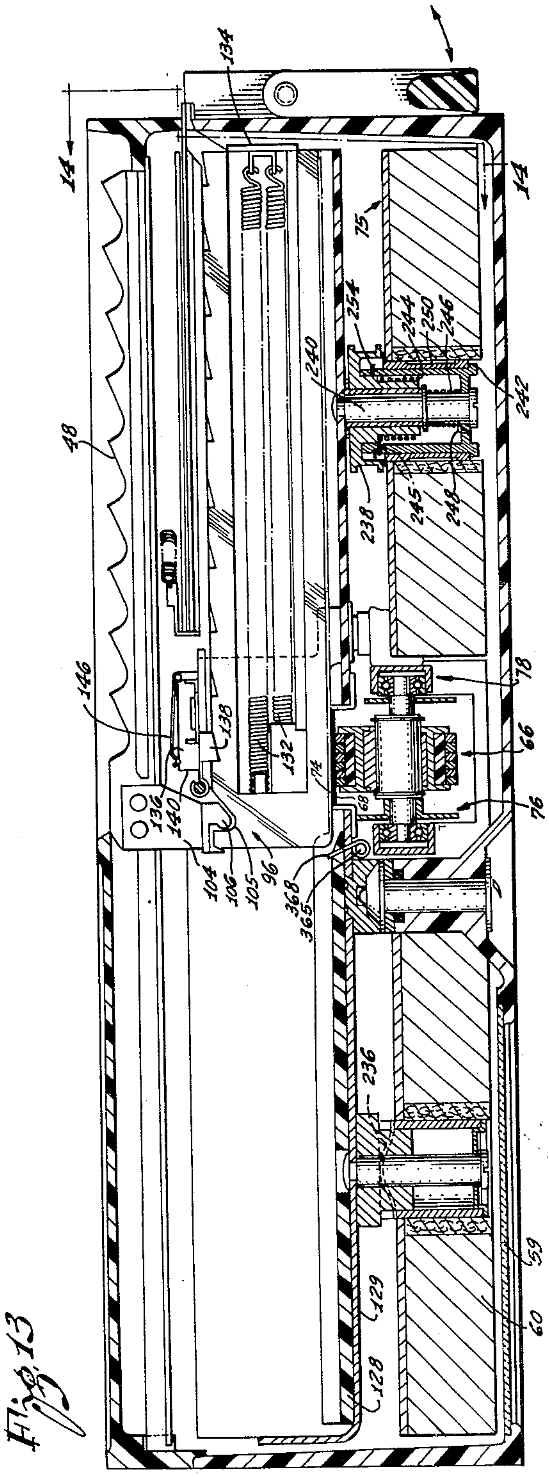
Figure 14:
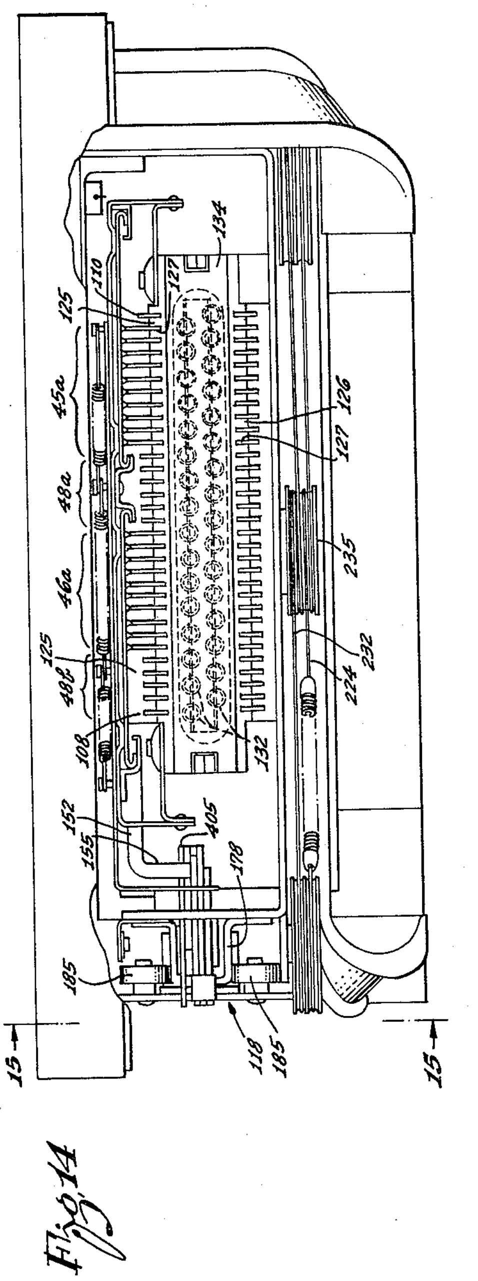
Figure 15:
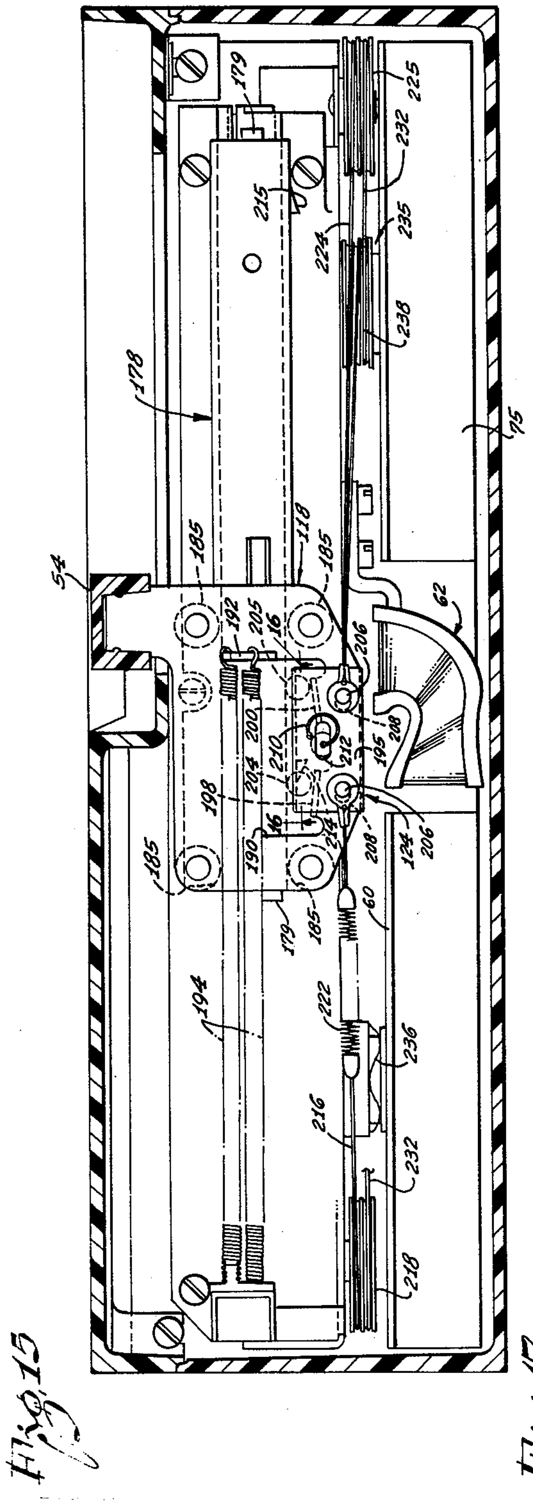
Figure 17:
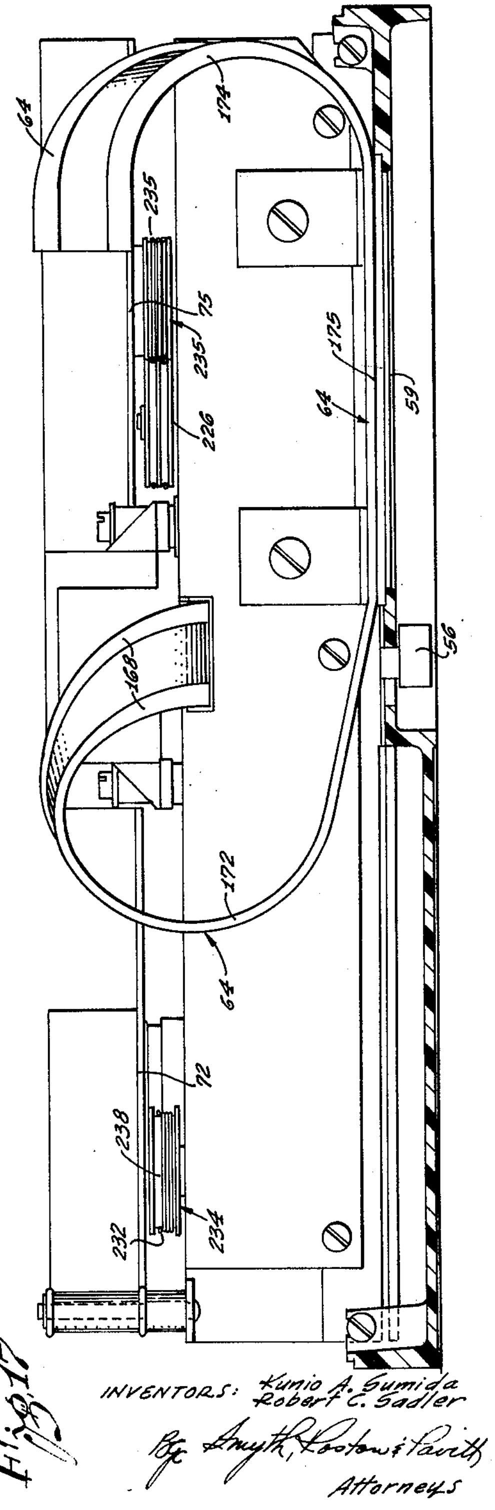
Figures 16, 18, 19, 20:
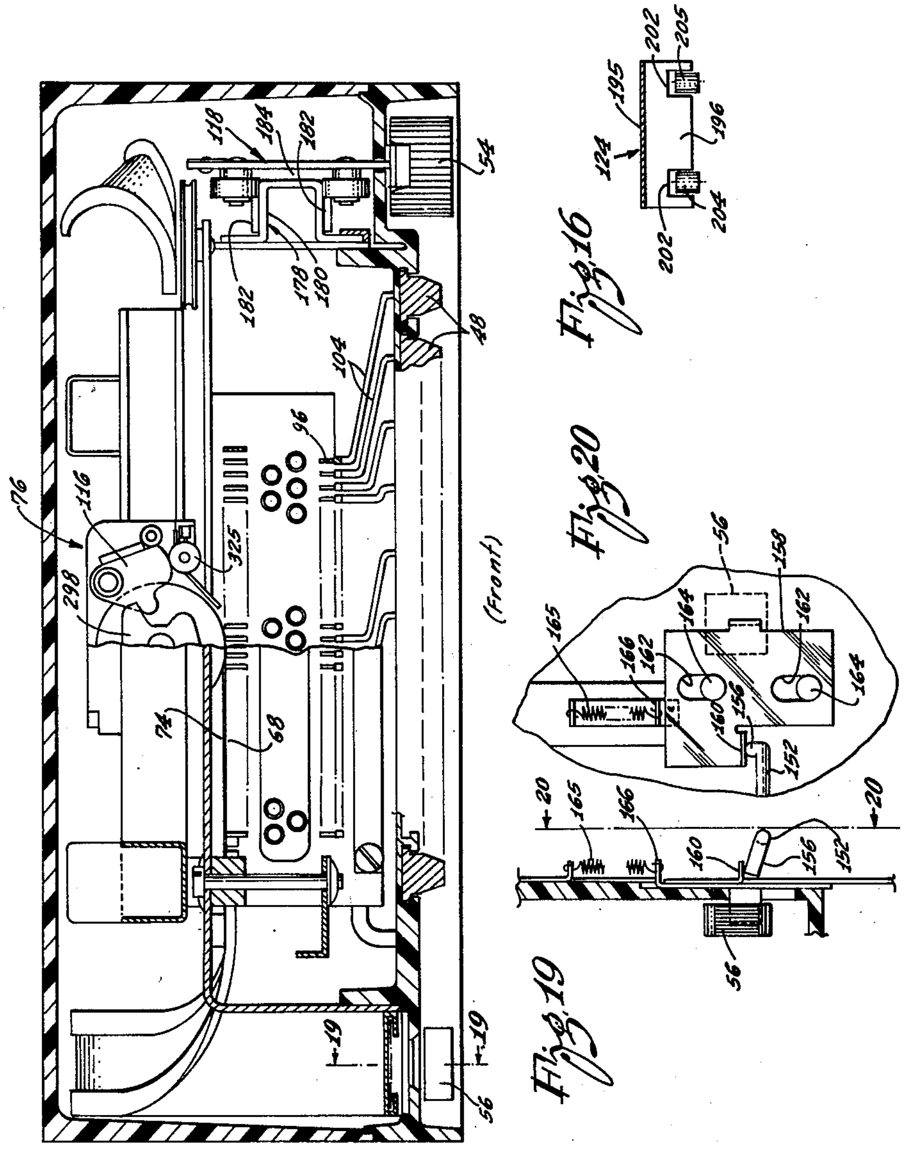
Figures 21, 22:
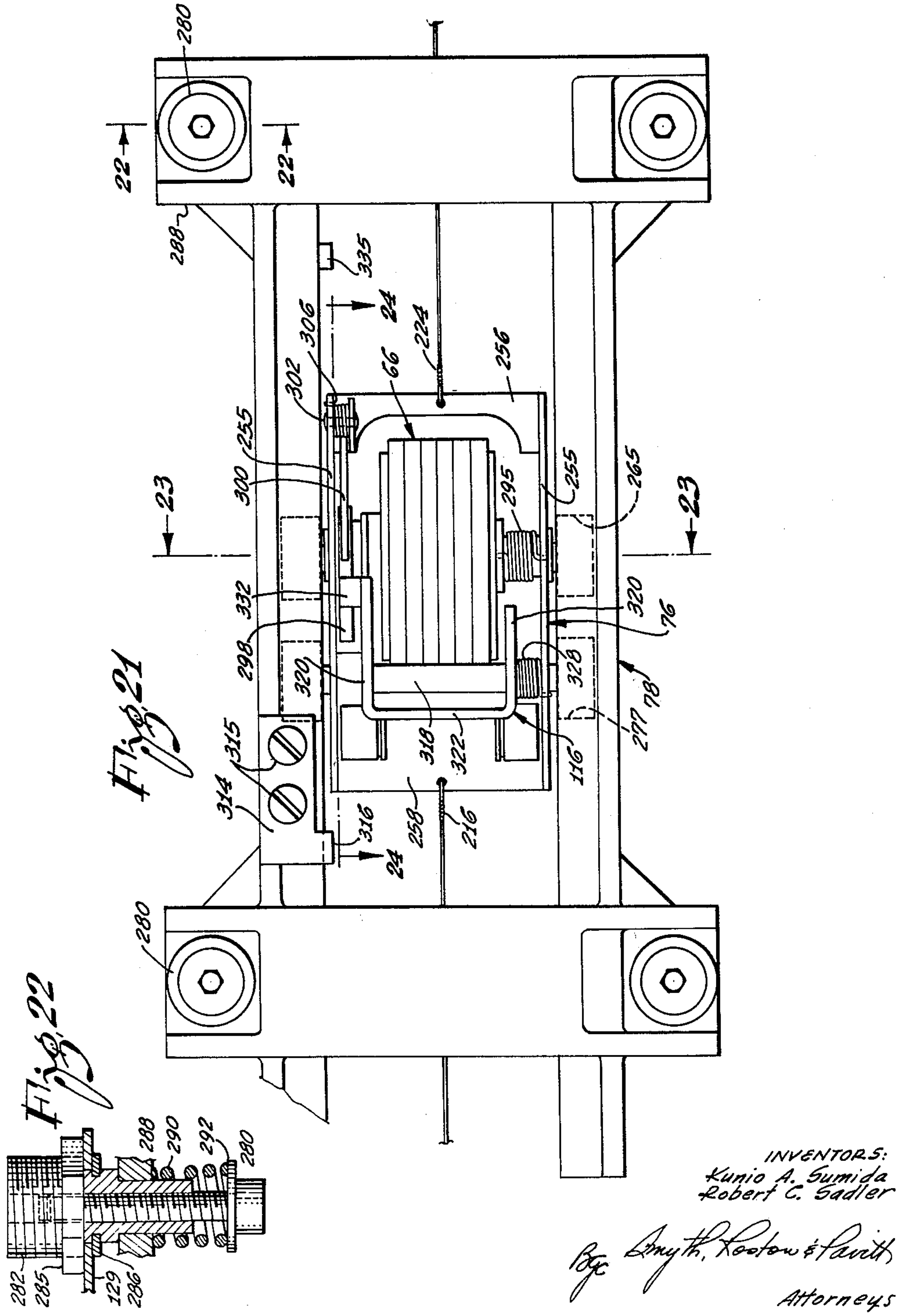
Figure 23:
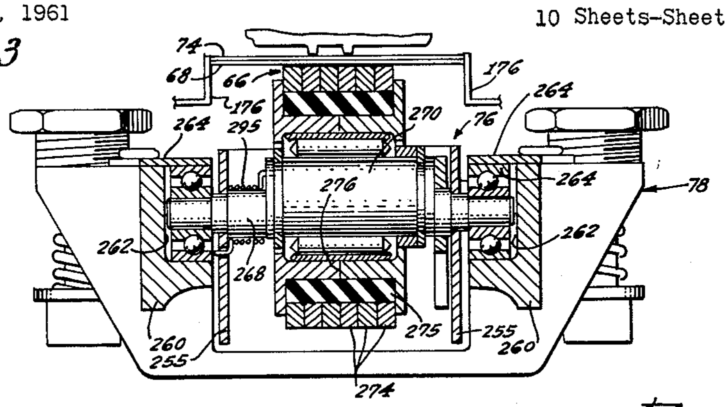
Figures 24, 25:
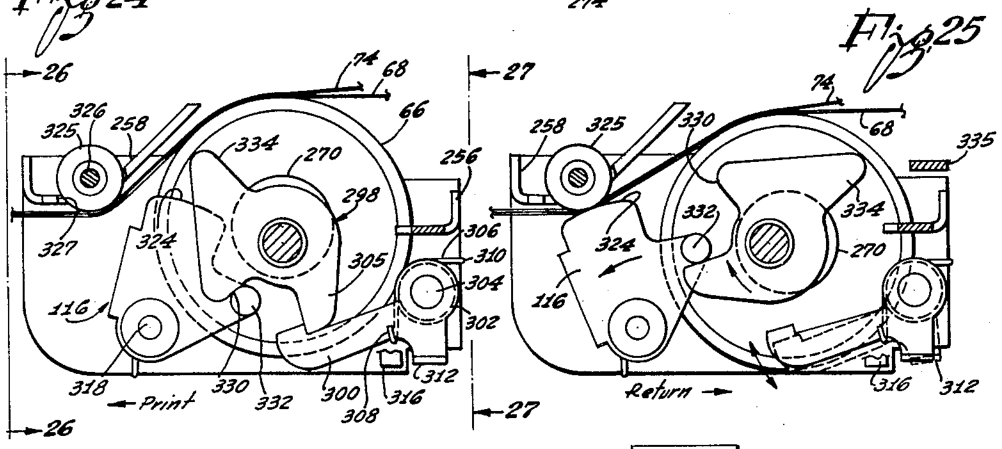
Figure 26:
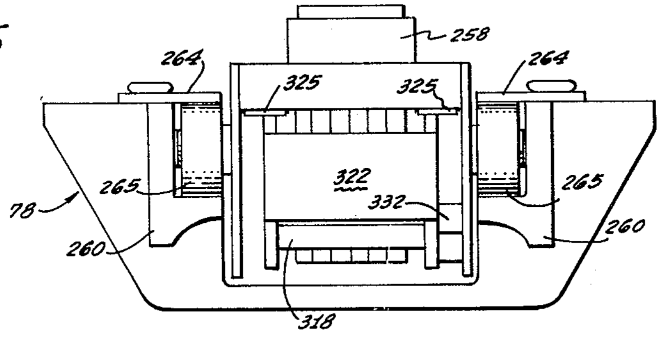
Figure 27:
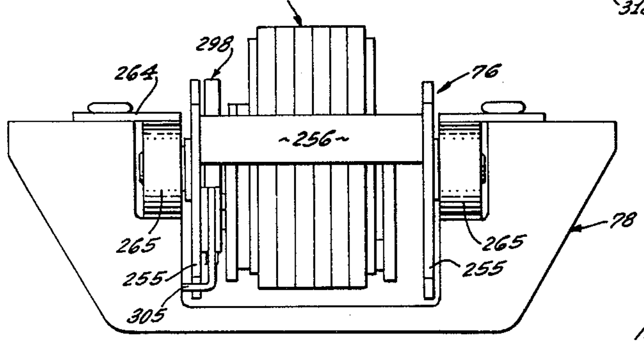

FIG. 6 is a front elevation of the device with the front wall removed to show the working parts. Included in this view is a portion of a latching arrangement for preventing a printing operation unless both of the data cards are fully inserted, the two data cards being shown in phantom in retracted positions and the parts of the latching mechanism being shown at their normal positions prior to actuation by the data cards;

FIG. 7 is a plan view of a bank of ratchet pawls for the bank of coding members;

FIG. 8 is a section along the line 8—8 of FIG. 7;

FIG. 9 is a view partly in elevation and partly in section indicating how the latching arrangement of FIG. 6 responds to insertion of one of the two data cards;

FIG. 10 is a similar view showing how the latching arrangement responds to the insertion of the second card;

FIG. 11 is a section along the line 11—11 of FIG. 10 showing portions of the same latching arrangement;

FIG. 12 is a rear elevation of the device with the back wall removed to reveal the mechanism for advancing the tape and actuating the printing means;

FIG. 13 is a section taken along the angular line 13—13 of FIG. 12 showing the code members in their normal retracted positions;

FIG. 14 is a section taken along the angular line 14—14 of FIG. 13 showing the two ends of the U-shaped code member, the finger bars associated with ten of the code members being omitted for clarity of illustration;

FIG. 15 is an elevational view as seen along the line 15—15 of FIG. 14 with the wall of the device removed to reveal the working parts;

FIG. 16 is a fragmentary sectional view along the line 16—16 of FIG. 15 showing the construction of the reverse-blocking cage of the printing mechanism which forces the operator to complete a printing cycle once the printing cycle is started;

FIG. 17 is an elevational view of the device as seen along the line 17—17 of FIG. 12, the corresponding wall removed to reveal the working parts;

FIG. 18 is a view similar to FIG. 14 with additional structure including finger bars;

FIG. 19 is a fragmentary section taken as indicated by the line 19—19 of FIG. 18 showing means whereby a manually operable clearing knob operates a mechanism for releasing the latched code members, the clearing knob being employed whenever an error makes it necessary to restart the procedure of introducing data;

FIG. 20 is a fragmentary elevational view of the same mechanism as seen along the line 20—20 of FIG. 19;

FIG. 21 is an enlarged elevation of the printing carriage and the associated track structure;

FIG. 22 is a transverse section along the line 22—22 of FIG. 21 illustrating the spring suspension for the track that carries the printing carriage;

FIG. 23 is a transverse section taken as indicated by the line 23—23 of FIG. 21 showing how the printing roller is mounted on the printing carriage;

FIG. 24 is a section along the line 24—24 of FIG. 21 showing the mechanism for shifting the printing roller toward and away from the recording tape and also showing mechanism for gripping the recording tape to advance the recording tape after a printing operation, the parts being shown with the printing roller in printing contact with the pair of tapes and with the tape-gripping means in its release position;

FIG. 25 is a view similar to FIG. 24 showing the printing roller shifted out of its pressure applying position and showing the tape-gripping mechanism in its effective position for pulling the tape after a printing operation is completed;

FIG. 26 is an elevation of one end of the printing carriage as viewed along the line 26–26 of FIG. 24;

FIG. 27 is an elevation of the other end of the printing carriage as viewed along the line 27–27 of FIG. 24;

FIG. 28 is a fragmentary elevational view showing the means for blocking the writing operation unless data has been introduced by manipulation of the finger keys;

FIG. 29 is a side elevational view of one of the code members that is actuated by a code card;

FIG. 30 is a side elevation of a code member that is actuated by finger manipulation; and FIG. 31 is a rear elevation of the register on a reduced scale showing a window for viewing the supply reel for the pair of tapes.

*General Description and Operation*

Figure 1:
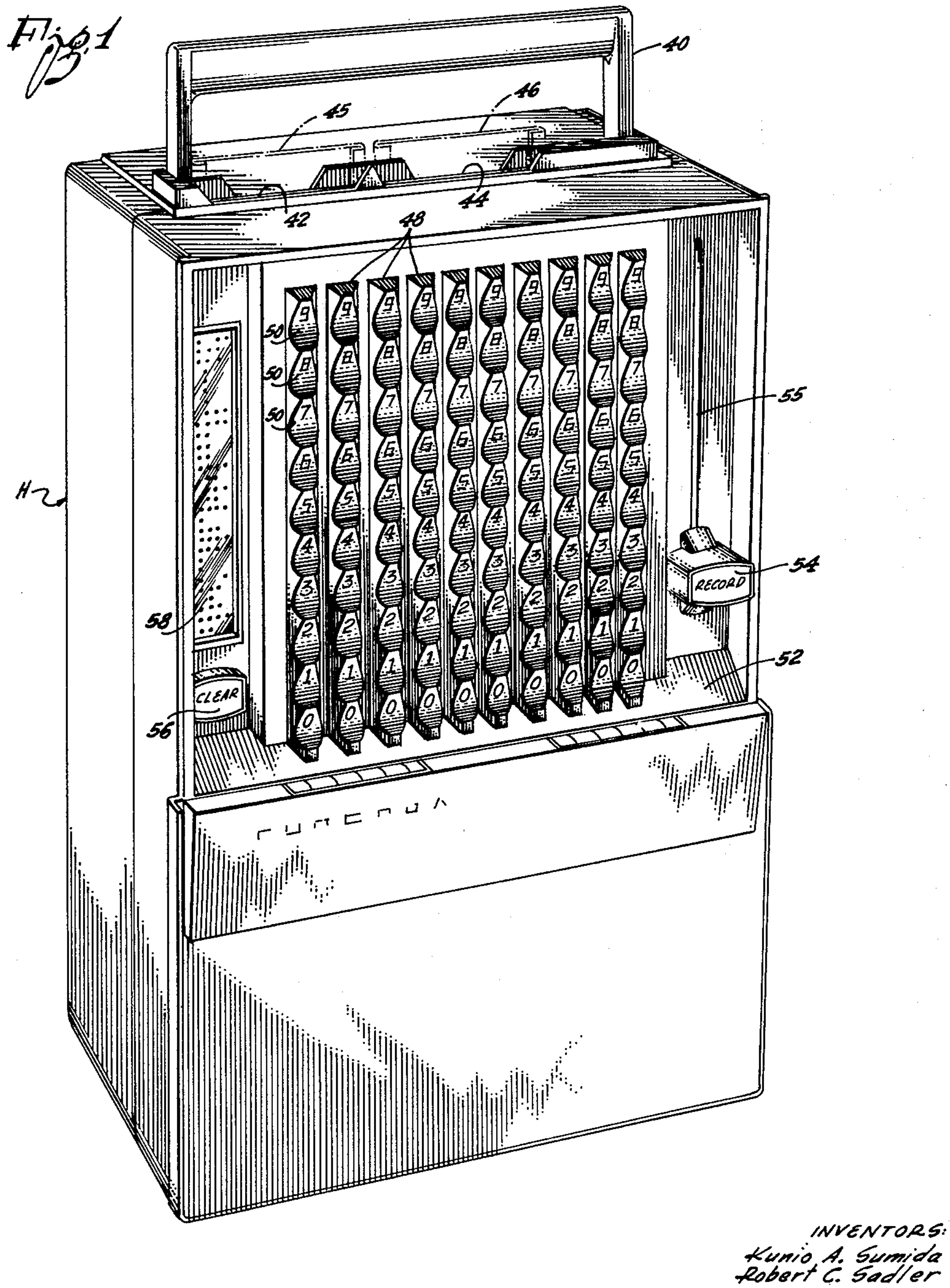
FIG. 1 is a perspective view of the presently preferred embodiment of the invention.

The working parts of the register are mounted on suitable support structure inside a housing that is generally designated H and is best shown in FIG. 1. The housing has a foldable handle 40 at its upper end and its upper end further has a pair of slots 42 and 44 to receive a corresponding pair of code cards 45 and 46. Exposed on the front face of the housing is a bank of ten keys or finger bars 48, each of which is serrated to form ten shoulders 50 which are numbered from zero to nine as shown. To use a finger bar 48 to register data, the operator places a finger on the particular shoulder 50 that corresponds to the required input digit and slides the finger bar longitudinally downward until the operator's finger is stopped by a slanting shelf 52 formed by the front wall of the housing. The numbered shoulder of a finger bar that is adjacent the shelf 52 is the number that will be printed. Thus after all of the finger bars have advanced as required to introduce given data, the given data may be visually checked by merely glancing at the bank of finger bars.

To one side of the bank of finger bars 48, a plastic recording knob 54 is normally at its lower limit starting position as shown in FIG. 1. A printing operation is carried out by reciprocating the recording knob 54 throughout the range of a slot 55, the printing occurring on the initial upstroke of the recording knob. On the opposite side of the bank of finger bars is a clear button 56 which may be manipulated to restore the mechanism to its normal starting position in the event that an error is made in the manipulation of the finger bars. An elongated window 58 above the clear button 56 makes it possible for the operator to inspect data printed on the record tape. As shown in FIG. 31 the rear side of the housing is provided with a second window 59 to make it possible for the operator to ascertain at a glance the quantity of tape on the supply reel inside the housing.

As heretofore stated, this embodiment of the invention employs a record tape and an associated transfer tape which functions in the manner of carbon paper to transfer magnetic pigment to the record tape. FIG. 12 shows a supply reel 60 on which the two tapes are wound in overlapping relation. From the supply reel 60 the two tapes, positioned face-to-face, enter a curved guide means 62 which cooperates with a second curved guide means 64 to direct the tape along a printing zone 65. For a printing operation, the printing zone is traversed by a printing roller 66. The used transfer tape indicated in dotted lines at 68 in FIG. 12 separates from the record tape at a point along the second curved guide means 64 and passes around a guide roller 70 to be wound onto a take-up reel 72. The record tape 74 which is indicated by dotted lines in FIG. 12 continues along the second curved guide means 64 and issues therefrom to be wound onto a second take-up reel 75.

The printing roller 66 is carried by a suitable printing carriage 76 which is mounted on a track structure that is generally designated by numeral 78. The previously mentioned recording knob 54 is operatively connected to the printing carriage 76 and also to the two take-up reels 72 and 75 by a system of cables whereby reciprocation of the recording knob not only causes corresponding reciprocation of the printing roller 66 but also advances the two tapes and operates the take-up reels to wind up increments of the two tapes.

For cooperation with the two code cards 45 and 46, two groups of ten U-shaped code members 80 are provided of the configuration shown in FIG. 29. Each code member 80 is a thin metal plate of U-shaped configuration having two legs 82 and 84. The leg 82 is in the form of a ratchet having ten ratchet teeth 85 corresponding to the ten digits 0–9. The other leg 84 is formed with spaced projections or code writing elements 86 which function in the manner of printing type and represent bits for indicating the ten integers in binary code. The ratchet leg 82 has a terminal toe 88 whereby the code member may be actuated by a card 45 or 46.

For cooperation with the two groups of code members 80, each of the code cards 45 and 46 may be of the construction shown in FIGS. 2–5. FIGS. 2–5 show the card 45 but both cards are alike. The code card 45 is made of thin sheet metal having folded flanges 90 along its opposite longitudinal edges. The code card is lanced and formed to provide projections in the form of code teeth 92 for engagement with the toes 88 of the code members 80. Each of the code teeth 92 is positioned along a longitudinal line that corresponds to the position of a code member 80. When a code card 45 or 46 is inserted into the register, the code teeth 92, which are positioned in accord with the values that are to be recorded, engage the code members 80 by their toes 88 and slide the code members to positions representing the desired values. Suitable pawl means cooperating with the ratchet teeth 85 hold the code members at the positions to which they are advanced. The card 45 has a notch 95 on its leading end which engages a stop of the same shape. The second card 46 has a similar notch at a different location to cooperate with a similar stop. If either of the two cards is inserted backwards or is inserted into the wrong slot 42 or 44 it will be stopped short of its fully inserted position to remind the operator of the error.

Corresponding to each of the ten keys or finger bars 48, is a code member 96 of the configuration shown in FIG. 30. Each code bar 96 has a ratchet leg 98 with ten teeth 99 and has a printing leg 100 with spaced projections or code writing elements 102. Each of the finger bars 48 is operatively connected to the corresponding code member 96 by an angular member 104 as indicated in FIGS. 13 and 18. For this purpose, as shown in FIG. 13, each of the code members 96 is formed with a recess 105 for interlocking engagement with a toe 106 of a corresponding angular member 104 in the manner shown in FIG. 13. When a finger bar 48 is shifted to a position representing a selected integer, the corresponding code member 96 is correspondingly shifted and is retained at its advanced position by a suitable corresponding pawl 138 engaging a ratchet tooth 99 of the code member.

FIG. 14 shows the sequential arrangement of various code members 80 that are operated by the two code cards 45 and 46 and the various code members 96 that are operated by the finger bars 48. In FIG. 14 the group of ten code members 80 that is controlled by the first card 45 is indicated by the bracket *45a*. The second group of ten code members 80 that is controlled by the second card 46 is indicated by the bracket *46a*. The ten code members 86 that are controlled by the ten finger bars 48 are divided into two groups. One group of six is indicated by the bracket *48a* and the group of the remaining four is indicated by the bracket *48b*. The ten code members 96 are divided into the two groups *48a* and *48b* for convenience in connecting the code members to the finger bars 48. In addition to these thirty adjustable code members 80 and 96 there are two fixed code members 108 and 110 at the opposite ends of the row to indicate respectively the beginning and the end of the data to provide commands for the computer when the data on the recording tape is transferred to the computer.

It is to be noted that the finger bars 48 are beveled as may be seen in FIG. 1 in the region of the shoulders 50 that are employed to operate the finger bars. The beveling serves to increase the spacing between the shoulders of adjacent finger bars to eliminate the possibility of the two finger bars being inadvertently operated simultaneously by one finger of the operator.

To carry out a recording cycle, the operator first applies the two code cards 45 and 46 to the register by inserting the code cards into the corresponding slots 42 and 44 at the top of the housing, being sure to insert each card to its limit position. The operator then manipulates the ten finger bars 48 selectively in accord with the additional data that is to be added. Then the operator reciprocates the recording knob 54 to cause the printing roller 66 to reciprocate across the printing zone.

On the upstroke of the recording knob 54 the printing roller 66 presses the two tapes 68 and 74 against the printing teeth of the twenty code members 80 (FIG. 18), the ten code members 96 and the two fixed code members 108 and 110. During this printing stroke the printing roller 66 is positioned against the two tapes in the manner shown in FIG. 24. At the end of the printing stroke the printing roller 66 is retracted slightly out of pressure contact with the two tapes and at the same time a tape-engaging member 116 shown in FIG. 25 moves in position to grip the two tapes to cause the two tapes to be advanced on the return movement of the printing roller. The return movement of the printing roller 66 is caused by the return movement of the recording knob 54.

FIG. 12 shows a cable system that is actuated by the recording knob 54. This cable system operatively connects the recording knob 54 to the printing roller 66 for reciprocation of the printing roller and, in addition, the cable system also applies operating force to the take-up reel 72 for the transfer tape and the take-up reel 75 for the record tape. Thus the cable system causes the two tapes to be wound on the two take-up reels respectively as the two tapes are advanced by the return movement of the printing roller 66.

FIG. 15 shows how the recording knob 54 is mounted on a recording knob carriage that is generally designated 118. FIGS. 9, 10 and 11 show safeguard means in the form of an arrangement of latches to prevent movement of the record knob carriage 118 away from its normal starting position unless both of the code cards 45 and 46 are fully inserted and unless at least one of the finger bars 48 is manipulated for recording of data. As shown in FIG. 10, a locking member 120 blocks movement of the recording knob carriage 118 unless both of the code cards 45 and 46 are fully inserted and a second locking member 122 blocks movement of the recording knob carriage unless at least one of the finger bars 48 is shifted from its normal starting position. The specific construction and operation of the latch arrangement shown in FIGS. 9, 10 and 11 will be described later.

As shown in FIG. 15 the recording knob carriage 118 is provided with a safeguard in the form of what may be termed a ratchet cage, generally designated 124, which functions in the general manner of a reversible ratchet since it permits the recording knob carriage to advance on the printing stroke while positively preventing retraction of the recording knob carriage and, after the printing stroke is completed, permits the return stroke of the recording carriage but will not permit reversal of the return stroke.

It is apparent that the described register makes it impossible to record data unless both of the data cards 45 and 46 are fully inserted and unless additional data is supplied by manipulation of at least one finger bar 48. It is also apparent that the register inherently prevents incomplete printing operations to avoid consequent errors. A further safeguard is that the various code members 80 and 96 remain at their latched advanced positions until the printing stroke is completed, whereupon all of the code members are unlatched automatically and are returned by spring force to their normal initial positions. By virtue of this arrangement, once the various code members 80 and 96 have been advanced to selected positions, the operator does not neglect to print the data because the printing operation is necessary to return the code members to their normal starting positions in preparation for a new operating cycle.

The window 59 on the back of the register makes it possible for the operator to observe the amount of unused tape in reserve. The window 58 may be used to check on whether or not the two tapes have been advanced by the return movement of the recording knob.

*Details of the Mechanism Associated With the Code Members*

When the U-shaped code members 80 and 96 are in their normal retracted positions, their inner longitudinal edges are in sliding engagement with a pair of corresponding guide plates 125 and 126 (FIG. 14), each guide plate having a longitudinal groove 127 in sliding engagement with each code member. As shown in FIGS. 6 and 13, a third guide plate 128 mounted on a fixed support plate 129 is formed with similar parallel guide grooves 130 into which outer longitudinal edges of the U-shaped code members 80 and 96 enter when the code members are advanced from their normal retracted positions. The guide grooves 130 stabilize the code members at their advanced positions. The three guide plates 125, 126 and 128 may be made of metal or of suitable plastic, for example, nylon, Teflon or Delrin.

As shown in FIG. 13 each of the code members 80 and 96 is urged towards its normal retracted position by a corresponding coil spring 132. The coil springs 132 are arranged in two staggered rows as indicated in FIG. 14 with the upper ends of the coil springs secured to a bracket 134 shown in FIGS. 13 and 14. An important advantage of employing U-shaped code members is that it makes possible this compact assembly of the code members and the associated coil springs 132. It is to be noted that the coil springs are advantageously of substantial length and that the coil springs are nearly co-extensive with the code members.

The pawl or latch means for releasably holding the various code members 80 and 96 at the positions to which they are advanced during data input may be of the construction shown in FIGS. 7, 8 and 13. Corresponding to each of the thirty movable code members is a ratchet pawl 136 having a tooth 138 and having an overhanging release shoulder 140 adjacent the tooth. The various ratchet pawls 136 are seated in corresponding slots 142 of a latch holder 144. As shown in FIG. 8 each of the slots 142 is formed with a circular recess to journal a circular enlargement 145 on the inner end of the corresponding ratchet pawl. Each of the pawls 136 is confined and at the same time is urged to its effective latching position by means of a corresponding leaf spring 146. As shown in FIG. 7, the thirty leaf springs 146 are formed by slotting a sheet 148 of spring metal, the sheet being anchored to the latch holder 144 by screws 150, which also secure the holder 144.

The means for unlatching all of the code members 80 and 86 when a printing operation is completed comprises a rocker shaft 152 shown in FIGS. 8, 13, 14, 19 and 20. As shown in FIG. 8, the rocker shaft 152 carries a longitudinal blade 154 which normally lies under the release shoulders 140 of the thirty ratchet pawls. As shown in FIGS. 6 and 14 the rocker shaft 152 is formed with an operating arm 155 at one end for actuation by the recording knob carriage 118 and as shown in FIGS. 6, 19 and 20, the rocker shaft is formed with a second operating arm 156 at its other end for actuation by the clear button 56. As will be described latre, the lateral arm 155 is actuated by the recording knob carriage 118 at the end of a printing stroke by means of mechanism shown in FIG. 10, the blade 154 of the rocker shaft lifting the thirty latch pawls 136 by their release shoulders 140 to release the thirty code members 80 and 96.

As best shown in FIGS. 19 and 20, the clear button 56 is mounted on a slidable plate 158 which has a flange 160 for operating the arm 156 of the rocker shaft 152. The slidable plate 158 is formed with longitudinal slots 162 for engagement by retaining pins 164. A suitable spring 165 is connected to a second flange 166 of the slidable plate 158 and normally holds the slidable plate and the clear knob 56 in their normal positions. When an error is made in the manual advancing of the code members 80 and 96, the operator shifts the clear knob 56 to cause the slidable plate 158 to rock the rocker shaft 152 for releasing the various code members 80 and 96 to permit the coil springs 132 to return the code members to their normal starting positions.

*Means for Guiding the Two Tapes*

Referring to FIG. 12, the transfer tape 68 and the record tape 74 pass from the supply reel 60 to the curved guide means 62. The curved guide means 62 comprises a strip of sheet metal with its opposite sides formed with overhanging flanges 168 to slidingly confine the opposite longitudinal edges of the two tapes. The guide means 62 makes a complex bend. As heretofore stated, the two tapes stretch from the curved guide means 62 across the printing zone to the second curved guide means 64. The second curved guide means 64 is also formed with overhanging flanges 168 for sliding engagement with the edges of the two tapes. The two guide flanges 168 of the second guide means 64 are cut away as indicated at 170 to permit the transfer tape 68 to separate from the record tape so that the transfer tape may pass to the take-up reel 72.

The guide means 64 is of the shape best shown in FIG. 17, being formed with two opposite 90° bends 172 and 174 to direct the record tape 74 into the second take-up reel 75. The straight portion 175 of the guide means 64 in the writing zone between the two bends exposes the imprints on the record tape to the previously mentioned window 58. The two tapes are accurately guided through the writing zone by a pair of longitudinal guides 176 shown in FIGS. 13 and 23 that slidingly engage the side edges of the two tapes.

*Recording Knob Carriage*

The recording knob carriage 118 on which the recording knob 54 is mounted is shown in FIGS. 14, 15 and 18. As best shown in FIG. 15 the recording knob carriage 118 is in the form of a plate that is mounted for movement along a track generally designated 178 between two opposite stops 179. As shown in cross section in FIG. 18 the track 178 comprises an inverted channel member 180 of hat-shaped cross section. Two longitudinal strips 182 are mounted on the opposite sides of the inverted channel and a third wider longitudinal strip 184 is mounted on the top of the channel to form two longitudinal guideways. As indicated in dotted lines in FIG. 15 the recording knob carriage 118 is provided with two pairs of rollers 185, and as shown in FIGS. 14 and 18, each pair of the rollers straddles the track in engagement with the opposite guideways that are formed by the strips 182 and 184.

As shown in FIG. 15, the plate which forms the recording knob carriage 118 is formed with an elongated opening 190 and with a tongue 192 at one end of the opening. A pair of coil springs 194 for urging the recording knob carriage towards its normal starting position are connected to the tongue 192, the opposite ends of the coil springs being anchored to the fixed structure of the register.

The previously mentioned ratchet cage 124 that is carried by the recording knob carriage 118 is in the form of an angular plate. As shown in FIGS. 15 and 16, one leg 195 of the angular plate rests on the top of the recording knob carriage 118 and the other leg 196 extends into the elongated opening 190 of the carriage adjacent the side of the track 178. Mounted on the underside of the recording knob carriage 118 is a pair of oppositely inclined wings 198 and 200. Adjacent the two wings 198 and 200, respectively, the leg 196 of the angular plate 124 is formed with two recesses 202 as shown in FIG. 16. The two recesses 202 in cooperation with the two corresponding wings 198 and 200 serve as cages for loosely retaining a corresponding pair of rollers 204 and 205 in contact with the side of the track 178.

As shown in FIG. 15, the angular plate that forms the ratchet cage 124 is slidingly mounted on the recording knob carriage 118 by a pair of studs 206 which extend through corresponding longitudinal slots 208 of the angular plate. It is contemplated that the ratchet cage 124 will be alternately shifted to its two opposite limit positions relative to the recording knob carriage 118 and that suitable spring means will be provided to yieldingly maintain the ratchet cage at its two alternate positions. For this purpose a C-shaped spring 210 may have one end secured to the ratchet cage 124 with its other end connected to a portion of the recording knob carriage 118 that is exposed through a central slot 212 of the ratchet cage.

FIG. 15 shows the C-shaped spring 210 yieldingly maintaining the ratchet cage at its leftward limit position with respect to the recording knob carriage 118. It is apparent that since the C-shaped spring 210 tends to expand resiliently and since the C-shaped spring is contracted at the midpoint in the range of movement of the ratchet cage, forcing the ratchet cage from one of its limit positions past the midpoint towards the other limit position results in the C-shaped spring moving the ratchet cage the remaining distance to the other position with a snap action.

When the ratchet cage 124 confining the two rollers 204 and 205 is in its leftward position shown in FIG. 15, the wing 198 of the recording knob carriage 118 only loosely confines the roller 204, but the wing 200, due to the pressure of the C-shaped spring 210, closely confines the roller 205. The recording knob carriage 118 is, therefore, free to move to the right but any tendency of the carriage to move to the left is blocked by the roller 205 wedging between the wing 200 and the side of the track 178 with a binding action. On the other hand, if the ratchet cage 124 were shifted from its rightward limit position shown in FIG. 15 to its leftward position with corresponding shift of the two rollers 204 and 205, the left wing 198 would confine the roller 204 in a binding manner to prevent rightward movement of the carriage.

The shifting of the ratchet cage 124 between its two alternate positions for shift of the two rollers is accomplished by means of two opposite stops 214 and 215 (FIG. 15) on the track 178. At the normal starting position of the recording knob carriage 118 shown in FIG. 15 the pull of the two coil springs 194 holds the recording knob carriage against one of the stops 179. The ratchet cage 124 is held at its rightward relative position. The ratchet cage remains in this rightward position throughout the printing stroke which is rightward in FIG. 15. When the printing stroke is completed, however, the ratchet cage 124 strikes the second stop 215 and is thereby returned to its leftward position to permit the leftward return movement of the recording knob carriage. Thus the ratchet cage 124 prevents return movement of the recording knob carriage throughout the printing stroke of the carriage and throughout the return movement of the carriage prevents reversal of the carriage until the return movement is completed.

*Cable System*

The cable system is shown in FIGS. 12, 14 and 15. One cable 216 connected to one of the two studs 206 of the recording knob carriage 118 makes a 180° turn around one peripheral groove of a double grooved guide pulley 218 and then passes around a guide pulley 220 to reach one end of the printing carriage 76. In the construction shown, the two ends of a take-up spring 222 are connected to spaced portions of this cable. A second cable 224 connected to the second stud 206 of the recording knob carriage 118 passes around one peripheral groove of a double-grooved guide pulley 225 and then engages a peripheral groove of a double-grooved guide pulley 226 to reach a small guide pulley 228. To make a 90° change in direction, the cable 224 passes around nearly 360° of the small guide pulley 228 to reach the second end of the printing carriage 76. The second cable 224 may also be provided with a shock absorber spring 230.

A third relatively long cable 232 has its opposite ends connected to the two studs 206 of the recording knob carriage 118. From one stud 206, the third cable 232 passes around the second groove of the double-grooved cable 218 and then makes approximately two wraps around a capstan 234 on the hub of the take-up reel 72 for the transfer tape 68. From the capstan 234, the cable 232 passes around the second groove of the double-grooved guide pulley 226 and then makes approximately two wraps around a capstan 235 on the hub of the take-up reel 75 for the record tape 74. From the capstan 235, the cable 232 passes around the second groove of the double-grooved guide pulley 225 to reach the second stud 206 of the recording knob carriage 118.

The two capstans 234 and 235 actuate the corresponding take-up reels 72 and 75, respectively in such a manner as to wind up tape. As indicated in FIGS. 13 and 15, the hub of the supply reel 60 is provided with frictional resistance by means of a Marcel spring 236 to keep the two tapes under tension.

The two actuating capstans 234 and 235 may be of the construction shown in FIG. 13 which shows the capstan for the take-up reel 75 for the record tape 74. A spool member 238 around which the cable 232 is wrapped is rotatably mounted on a fixed axle 240 of the take-up reel 75. A cylindrical member 242 is also rotatably mounted on the fixed axle 240 by one end, the other end of the cylindrical member being journaled on the hub of the spool member 238 as shown. A first spring 244 coiled about the hub of the spool member 238 has one end 245 anchored to the cylindrical member 242, the other end being free. When the spool member 238 is rotated by the cable 232 in a direction to wind the tape on the take-up reel 75, the first spring 244 grips the hub of the spool member to cause the cylindrical member 242 to rotate with the spool member. When the spool member 238 is rotated in the opposite direction, however, the first spring 244 loosens and is therefore ineffective to cause reverse rotation of the cylindrical member 242.

A second coil spring 246 wrapped around the fixed axle 240 has one end 248 attached to the cylindrical member 242, the second end of the spring being free. This second spring 246 tightens around the fixed axle 240 to prevent reverse rotation of the cylindrical member 242 but freely permits rotation of the cylindrical member in the tape-winding direction. Thus the two springs function in effect as a ratchet or one-way clutch to cause the cable system to act on the two take-up reels only on the return stroke of the recording knob carriage 118.

The hub 250 of the take-up reel 75 is rotatably mounted on the cylindrical member 242 and is frictionally connected with the cylindrical member by a Marcel spring 252. The Marcel spring 252 is confined between the end of the cylindrical member 242 and a snap ring 254 on the cylindrical member.

The amount of rotation imparted to the spool member 238 by each reciprocation of the cable 232 is sufficient to take up the required amount of tape when only one or two windings of tape are on the take-up reel. When several windings are on the take-up reel the oscillation of the spool member 238 is excessive and consequently the cylindrical member 242 overtravels with respect to the reel hub 250 as permitted by the frictional engagement of the Marcel spring 252 with the hub.

*Printing Carriage*

The construction of the printing carriage 76 and its associated mechanism is shown in FIGS. 12, 13 and 21–27. As shown in FIGS. 21 and 23 the printing carriage 76 has a pair of parallel side plates 255 which are interconnected at one end by a transverse member 256 and are interconnected at the other end by a transverse member 258. The printing carriage 76 moves on the track structure 78 to traverse the printing zone longitudinally of the pair of tapes. As shown in FIG. 21 the track structure 78 is a rectangular frame with two longitudinal side rails 260 and as shown in section in FIG. 23, the two side rails provide corresponding longitudinal grooves 262. The grooves 262 which are formed in part by removable top plates 264 confine and guide a pair of corresponding support rollers 265 which support the carriage and carry the load imposed by the printing pressure of the printing roller 66. The two support rollers 265 are in the form of ball bearings on the opposite ends of an axle 268 which is rotatably mounted in the two side plates 255 of the carriage.

The axle 268 has an eccentric central portion 270 which journals the previously mentioned printing roller 66. In the construction shown the printing roller comprises a series of peripheral plastic rings 274 backed up by a rubber sleeve 275. The printing roller is made in two section which join at the line 276 in FIG. 23, the two sections being separable to facilitate assembly of the rubber sleeve and the plastic rings. The peripheral rings 274 may be made of a suitable plastic such as nylon, Teflon or Delrin.

To stabilize the printing carriage 76 about the axis of the axle 268 a second pair of rollers 277, on opposite sides of the carriage, indicated in dotted lines in FIG. 21, ride in the grooves 262 of the two side rails 260. The rollers 277 which may be made of a suitable plastic such as nylon, are mounted on the opposite side plates 255 of the printing carriage.

As shown in section in FIG. 22, the track structure 78 is supported at its four corners on adjustable screws 280 that are threaded into fixed bushings 282. In the construction shown, each of the bushings 282 extends through an aperture in a fixed support plate 129 and is secured by a nut 285 in cooperation with a snap ring 286. Each corner portion 288 of the track structure 78 is yieldingly supported by a coil spring 290 which rests on a shoulder 292 of the corresponding screw 280, the spring urging the corner portion upward. This spring suspension creates the required pressure of the printing roller 66 against the two tapes for transferring magnetic pigment from the transfer tape to the record tape. The printing pressure may be varied by adjusting the four screws 280.

The axle 268 is rotated to shift the printing roller 66 into and out of pressure contact with the two tapes. In FIG. 23 the central eccentric portion 270 of the axle is turned upward relative to the axis of rotation of the axle for pressure contact against the two tapes. As shown in FIGS. 21 and 23, a torque spring 295 wound around the axle 268 has one end anchored in an aperture in a side plate 255 of the carriage with its other end anchored to the eccentric portion 270 of the axle. The torque spring tends to rotate the axle clockwise as viewed in FIGS. 24 and 25 to retract the printing roller 66 from pressure contact with the two tapes.

In the printing position of the roller 66 shown in FIGS. 23 and 24, i.e. the upper position at which the printing roller makes effective pressure contact with the two tapes, the tendency of the axle to be rotated by the torque spring 295 is blocked by a latch arrangement comprising a latch plate 298 fixedly mounted on the axle 268 and a cooperative pawl 300. The pawl 300 has a cylindrical base portion 302 journaled on a pivot 304 on a side plate 255 of the carriage. When the printing roller 66 is in its effective printing position a finger 305 of the latch plate 298 is engaged by the pawl 300 in the manner shown in FIG. 24. The pawl 300 is urged towards the latch plate 298 by a torque spring 306, one end of the torque spring engaging the pawl as shown in FIG. 24 and the other end engaging the carriage.

The pawl 300 has an integral release finger 312 by means of which the pawl may be tripped to release the latch plate 298. As shown in FIG. 21, a bracket 314 mounted on the track structure 78 by suitable screws 315 has a tripping finger 316 in the path of the printing carriage 76 for abutment with the release finger 312 to trip the pawl 300 for retraction of the printing roller 66 from the tapes at the end of the printing stroke.

The previously mentioned tape-engaging member 116 is journaled on a cross pin 318 that is mounted in the two side plates 255 of the printing carriage 76. The tape-engaging member 116 is an angular plate having two parallel wings 320 at its opposite sides interconnected by a web 322, as shown in FIGS. 21 and 26. The two wings 320, which are journaled on the cross pins 318, are each formed with an eccentric edge 324. When the tape-engaging member 116 is in its effective position shown in FIG. 25 the two eccentric edges 324 grip the two tapes 68 and 74 by pressing the two tapes against a corresponding pair of plastic rollers 325. The plastic rollers 325 are carried by a shaft 326 mounted in the two side plates 255 of the printing carriage 76 and, as indicated in FIG. 24, extend through corresponding apertures 327 in the transverse member 258. The plastic rollers 325 which may be made of nylon or Delrin or the like serve as guide rollers in contact with the tape during the printing movement of the printing roller 66 and cooperate with the tape-engaging member 116 to grip the tape on the return movement of the printing carriage 76.

The tape-engaging member 116 is biased towards its effective tape-gripping position by a torque spring 328 shown in FIG. 21, one end of the torque spring being fixed to the tape-engaging member and the other end being anchored to the corresponding side plate 255 of the printing carriage. When the latch plate 298 is engaged by the pawl 300 to hold the printing roller 66 in its printing position as shown in FIG. 24, a shoulder 330 of the latch plate abuts a lug 332 on one of the wings 320 of the tape-engaging member 116 to hold the tape-engaging member in its ineffective retracted position in opposition to the torque spring 328. When the pawl 300 is tripped by the fixed trip finger 316 to release the latch plate 298, the tape-engaging member 116 is released to be swung by the torque spring 328 to its position shown in FIG. 25. Because of the eccentricity of the edges 324, the tape-engaging member 116 reacts to the resistance to movement of the two tapes and derives most of its gripping force from the resistance. In addition, the finger 305 of the latch plate 298 moves against the lug 332 to increase the pressure of the tape-engaging member against the two tapes, the added pressure being derived from the torque spring 295 that acts on the eccentric portion of the axle 268.

When the printing carriage 76 completes its return movement, the latch plate 298 is automatically cocked, i.e. rotated counter-clockwise from the release position shown in FIG. 25 to the engaged position shown in FIG. 24. For this purpose the latch plate 298 is formed with a cocking finger 334 for actuation by a fixed finger 335 shown in FIGS. 21 and 25. The fixed finger 335 is integral with a bracket 336 shown in FIG. 28 and is in the path of the cocking finger 334. As may be seen in FIG. 25, as the recording carriage 76 approaches the end of its return movement with the cocking finger 334 in the position shown, the cocking finger encounters the fixed finger 335 and is thereby rotated to the cocked or engaged position shown in FIG. 24. As the latch plate 298 returns to its cocked position in this manner, the shoulder 330 of the latch plate encounters the lug 332 to retract the tape-engaging means 116. At the same time, the finger 305 of the latch plate brushes against the pawl 300 to swing the pawl slightly as required for making engagement with the pawl.

*Locking Mechanism to Prevent Premature Printing Operation*

The construction of this mechanism is shown in FIGS. 6, 9, 10, 11 and 14.

As best shown in FIG. 10 the mechanism includes a wide yoke 340 having two short arms 342 and 344 positioned at the opposite ends of the range of movement of the recording knob carriage 118. The yoke 340 is slideably mounted on fixed pins 345 and 346 and for this purpose is formed with a pair of corresponding slots 348 in engagement with the pins.

To releasably hold the yoke 340 at its two opposite limit positions, the yoke is formed with a pair of spaced detent recesses 350 and 352 for yielding engagement by one arm 354 of a leaf spring. The leaf spring has a second arm 355 which is forked for urging the two previously mentioned locking members 120 and 122 towards their locking positions. As the recording knob carriage 118 approaches its normal starting position on its return stroke after a printing stroke, it abuts the arm 342 of the yoke 340, as shown in FIG. 10 to shift the yoke to its normal position. Consequently, the detent recess 352 shifts out of engagement with the spring arm 354 and the recess 350 shifts into engagement with the springarm. On the other hand when the printing knob carriage 118 approaches the end of the printing stroke it strikes the second finger 344 of the yoke 340 to shift the yoke to its alternate position at which the recess 352 is yieldingly engaged by the spring arm 354.

The previously mentioned operating arm 155 of the rocker shaft 152 is operatively connected to the yoke 340 to be actuated by the shift of the yoke that occurs when the recording knob carriage 118 reaches the end of its printing movement. Preferably the operating arm 155 of the rocker shaft is yieldingly connected to the yoke 340. For this purpose a suitable coil spring 356 is connected at one end to a flange 358 of the yoke 340 and is connected at its other end to the rocker shaft arm 155 to hold the rocker shaft arm against an edge of the yoke. As shown in FIG. 10, the yoke may be formed with a slot 360 to receive the rocker shaft arm. It is apparent that when the printing knob carriage 118 shifts the yoke 340 at the end of the printing stroke the yoke swings the operating arm 155 of the rocker shaft 152 to cause the previously mentioned blade 154 (FIG. 8) on the rocker shaft 152 to lift the ratchet pawls 136 for releasing the thirty code members 80 and 96 to permit the code members to return to their normal starting positions.

The two previously mentioned locking members 120 and 122 prevent a premature printing operation by normally blocking the path of the recording knob carriage 118 out of its starting position in the manner shown in FIG. 10. Both of the locking members are pivotally mounted on the previously mentioned pin 345.

The locking member 122 which is controlled by the finger bars 48 is operatively connected by a coil spring 362 to an operating arm 364 of a rocker shaft 365. As shown in FIG. 28, the rocker shaft 365 extends along the back face of the previously mentioned support plate 129 that carries the guide plate 128 for the finger bars 48. As shown in FIG. 28 the support plate 129 and the guide plate 128 are formed with two spaced rectangular apertures 366 and the rocker shaft 365 has bonded thereto a pair of corresponding longitudinal blades 368 which extend through the corresponding apertures. As shown in FIG. 13, the two blades 368 lie adjacent the leading ends of the code members 96 in the path of advance of the code members out of their normal retracted positions. The two blades 368 are positioned for operation by the two groups of code members 96, i.e. the groups 48*a* and 48*b*, respectively, indicated by brackets in FIG. 14.

Normally the previously mentioned leaf spring arm 355 holds the locking member 122 in its effective locking position shown in FIG. 10. When any one of the ten finger bars 48 is advanced, the corresponding code member 96 moves against one of the two blades 368 to rotate the rocker shaft 365 and thereby retract the locking member 122 from its effective locking position.

The other locking member 120 that normally blocks the printing movement of the recording knob carriage 118 is formed with a release finger 370 as best shown in FIG. 9 for operation by a lock-actuator generally designated 372. The lock-actuator 372 is in the form of a plate having a flange 374 that extends under the release finger 370 of the locking member 120. When the lock-actuator 372 is shifted slightly leftward from the position shown in FIG. 9 to the position shown in FIG. 10 it lifts the release finger 370 to swing the locking member 120 to its release position out of the path of advance of the recording knob carriage 118. The lock-actuator 372 makes this operating shift whenever both of the two code cards 45 and 46 are fully inserted into the corresponding slots 42 and 44.

The lock-actuator 372 is powered by a actuating spring 375, one end of which is connected to a tongue 376 of the lock-actuator and the other end of which is connected to a fixed pin 378. As shown in FIG. 9, the pin 378 extends through an elongated aperture 380 in the lock-actuator 372, the aperture being of a length to avoid interference by the pin with the longitudinal reciprocation of the lock-actuator.

A first latch member 382 for actuation by the first code card 45 is formed with a short slot 384 by means of which it is pivotally mounted on a fixed pivot pin 385 with freedom to shift slightly relative to the fixed pin. The first latch member 382 is flanged to form a latching finger 386 which normally engages a lateral shoulder 388 of the lock-actuator 372 to prevent operation of the lock-actuator by the actuating spring 375. A coil spring 390 is connected to the first latch member 382 at one end and its other end is connected to the previously mentioned fixed pin 378 to pull the first latch member against the lock-actuator 372.

A second latch member 392 corresponding to the second code card 46 is, in like manner, formed with a short slot 394 whereby it is pivotally mounted on a fixed pivot pin 395 with freedom to shift slightly relative to the pivot pin. The second latch member 392 is flanged to form a latching finger 396 for engagement with a lateral shoulder 398 of the lock-actuator 372. The second latch member 392 is biased towards the lock-actuator 372 by a coil spring 400, one end of the spring being connected to the latch member and the other end being connected to a fixed pin 402. The fixed pin 402 extends through an elongated aperture 404 in the lock-actuator 372, the aperture being of sufficient length to keep the fixed pin from interfering with the operating shift of the lock-actuator.

When either of the two code cards 45 and 46 is fully inserted before the other card, the corresponding latch member 382 or 392 disengages from the lock-actuator 372 but the other latch member 382 or 392 remains in engagement to prevent operation of the lock-actuator until the second code card is fully inserted. When both code cards are fully inserted, the lock-actuator 372 operates to retract the locking member 120 from the path of the recording knob carriage 118.

FIG. 6 shows the normal state of the lock-actuator 372 prior to the insertion of either of the two code cards 45 or 46. The actuating spring 375 is under tension to operate the lock-actuator 372 but both the first latch member 382 and the second latch member 392 are in effective engagement with the corresponding shoulders 388 and 398 of the lock-actuator to prevent operation of the lock-actuator. Because the actuating spring 375 overcomes the two latch member springs 390 and 400, the two latch member springs yield. Each of the two latch members 382 and 392 shifts relative to the corresponding fixed pins 385 and 395 in the direction of operation of the lock-actuator 372 as far as the two corresponding short slots 384 and 394 permit. Thus in FIG. 6 the two short slots 384 and 394 extend upward of the figure relative to the two corresponding fixed pins 385 and 395.

FIG. 9 illustrates the effect of fully inserting the code card 46 before the code card 45 is inserted. As the code card 46 reaches its fully inserted position it moves against the latch finger 396 of the second latch member 392 to force the latch finger out of engagement with the lateral shoulder 398 of the lock-actuator 372. As soon as the second latch member 392 moves out of engagement with the shoulder 398 the corresponding spring 400 is effective to shift the latch member relative to the fixed pin 395 to the degree permitted by the short slot 394. Consequently the second latch member 392 shifts to the right as viewed in FIG. 9 to shift the slot 394 to the right relative to the fixed pin 395. When the operator releases his finger pressure on the code card 46, the force of the latch spring 400 causes the second latch member 392 to retract the code card until the finger 396 of the second latch member again abuts the lock actuator 372. The latch finger 396 does not, however re-engage the shoulder 398 of the lock actuator 372 because in the meantime the second latch member has been shifted longitudinally by the spring 400. The lock-actuator 372 does not move because it remains immobilized by the first latch member 382.

When the other code card 45 is fully inserted by the operator, as shown in FIG. 10, it moves against the latch finger 386 of the first latch member 382 in the same manner and when the finger 386 is forced out of engagement with the shoulder 388 of the lock-actuator, the lock-actuator is operated by the actuating spring 375 to swing the locking member 120 to its release position. The recording knob carriage 118 is then free for carrying out the printing stroke.

Suitable means is provided to reset the lock-actuator 372 in opposition to the actuating spring 375 at the end of the printing stroke. For this purpose a bell crank 405 may be mounted on the previously mentioned pin 345, as shown in FIG. 10. One arm 406 of the bell crank 405 overhangs the flange 374 of the lock-actuator 372. The other arm 408 is in the path of a tongue 410 of the yoke 340.

When the yoke 340 is shifted from one of its limit positions to the other by the approach of the recording knob carriage 118 to the end of the printing stroke, the yoke rocks the bell crank 405 to cause the arm 406 of the bell crank to return the lock-actuator 372 to its normal position in opposition to the actuating spring 375. The return of the lock-actuator 372 to its normal position permits the two springs 390 and 400 to swing the two corresponding latch members 382 and 392 into engagement with the two corresponding lateral shoulders 388 and 398 of the lock actuator to hold the lock actuator in its normal retracted position.

Our description in specific detail of the selected embodiment of the invention will suggest various changes, substitutions and other departures from our disclosure within the spirit and scope of the appended claims.

We claim:

1. In a register for recording data on record means from an input code member insertable into the register, the combination of: means operatively coupled to said record means for extending said record means along a printing zone to receive data at the zone; a plurality of code members movable from normal starting positions along predetermined paths across the printing zone transversely thereof, said code members having spaced code writing elements thereon for selective positioning at the writing zone; means operatively coupled to said code members for traversing said printing zone to apply the selected writing elements in the printing zone to said record means to obtain a recording on the record means of the information on the selected writing elements in the printing zone; means for receiving the input code member; and means operatively coupled to said applying means and to said receiving means for preventing the applying means from applying the selected writing elements in the printing zone to said record means until the proper application of the input code member to the receiving means.

2. A combination as set forth in claim 1 in which said record means comprises a record tape and a transfer tape and in which said writing elements are printing elements and in which said traversing means comprises roller means to press the two tapes against said printing elements of the code members.

3. In a register for recording data on record means, the combination of: means operatively coupled to said record means for extending said record means along a writing zone to receive data at the zone; a plurality of code members movable from normal starting positions along predetermined paths across the writing zone transversely thereof, said code members having code writing elements spaced apart in the directions of said paths for selective positioning at the writing zone by selective advance of the code members across the writing zone from a starting position, said code writing elements representing different data values; latch means operatively coupled to said code members to releasably hold said code members at the selected positions to which they may be advanced; applying means operatively coupled to the code members to apply the selected writing elements of the code members to the tape means for recording data thereon; spring means urging said code members towards their normal starting positions; means operatively coupled to said latch means to release said latch means for movement of the code members by the spring means to the normal starting positions; and means operatively coupled to said releasing means for preventing said releasing means from releasing said latch means until the recording on the tape means of the recording data represented by the selective advance of the code means.

4. A combination as set forth in claim 3 in which said code members have ratchet teeth and in which said latch means comprises spring-pressed pawls for engagement with the ratchet teeth.

5. A combination as set forth in claim 3 which includes manually operable means operatively coupled to said latch means to release said latch means in the event of error in the advance of said code members.

6. In a register for recording data on record means from an input code member having first and second pluralities of portions, the combination of: means operatively coupled to said record means for extending said record means along a writing zone to receive data at the zone; means for receiving the input code member; first and second pluralities of code members movable from normal starting positions along predetermined paths across the writing zone transversely thereof and corresponding to the first and second pluralities on the input code members, said code members having spaced code writing elements for selective positioning at the writing zone by selected advance of the code members across the writing zone, the code members being disposed relative to the input code member upon the application of the input code member to the receiving means to cause the code members of the first plurality to advance to predetermined positions across said writing zone in response to application of the code input member to the receiving means; a plurality of manually operable keys corresponding to said second plurality of code members to advance the code members of the second plurality to selected positions; means operable at said printing zone to cause the code writing elements in the writing zone to record the corresponding data values on said record means; and safeguard means operatively coupled to said operable means and normally preventing operation of said operable means, said safeguard means being releasable in response to application of said code input member to the receiving means whereby a writing operation cannot be carried out unless said code input member is applied to the receiving means.

7. In a register for recording data on record means from an input code member having first and second pluralities of portions, the combination of: means operatively coupled to said record means for extending said record means along a writing zone to receive data at the zone; first and second pluralities of code members movable from normal starting positions along predetermined paths across the writing zone transversely thereof, the first and second pluralities of portions on the code members respectively corresponding to the first and second pluralities of portions on the input code member, said code members having spaced code writing elements for selective positioning at the writing zone by selected advance of the code members across the writing zone, the code members being disposed relative to the input code member upon the application of the input code member to the receiving means of the first plurality to advance to predetermined positions across said writing zone in response to application of the code input member to the receiving means; a plurality of manually operable keys corresponding to said plurality of code members to advance the code members of the second plurality to selected advanced positions; means operable at said writing zone to apply the selected code writing elements to said record means to record data thereon; and safeguard means operatively coupled to said operable means and normally preventing operation of said operable means, said safeguard means being releasable in response to advance of said code members of the second plurality of code members whereby said operable means cannot be operated after said code input member is applied to the register unless said keys are operated.

8. A combination as set forth in claim 7 which includes a second safeguard means operatively coupled to said movable means and normally preventing operation of said movable means, said second safeguard means being releasable in response to application of said code input member to the receiving means whereby said movable means cannot be operated unless both said code input member is applied to the register and said keys are operated.

9. In a register for obtaining a recording by an operator of data on record means, the combination of: means operatively coupled to said record means to extend said record means along a writing zone to receive data at the zone; a plurality of parallel closely spaced finger bars for advance longitudinally from starting positions by selected amounts, said finger bars having longitudinally spaced shoulder portions for selective engagement by the operator, said shoulder portions representing different data values; stop means extending across the region of the plurality of finger bars for abutment by the operator's finger whereby the movement of the operator's finger against the stop means with the finger in engagement with a selected shoulder of the finger bar advances the finger bar to a position representing the value corresponding to the selected shoulder; a series of code writing means operatively connected to each of said finger bars and movable thereby across said writing zone in sequence, said code writing means corresponding to said shoulders respectively of the finger bars and representing the data values corresponding to the shoulders whereby advance of a finger bar by a shoulder thereof places the corresponding code writing means at the writing zone; means operable at said writing zone to cause the code writing means at the writing zone to record the corresponding data values on said record means; and means operatively coupled to the finger bars and to the code writing means for preventing the recording of data values on said record means until the advance by the operator of at least one of the record bars from the starting position.

10. In a register for recording data on tape means, the combination of: means operatively coupled to said tape means to extend said tape means longitudinally along a writing zone to receive data at the zone; a plurality of code members positioned transversely of said writing zone and having spaced code writing means thereon, said code members being adjustable across the writing zone to position the code writing means selectively at the writing zone; means movable along said writing zone to cause the selected code writing means to record data on the tape means; means operatively coupled to said movable means for moving said movable means from a starting position at a first end of said zone in a first direction along said zone to a final position at a second end of the zone for a writing stroke and to return the movable means to its starting position from the final position in a second direction opposite to the first direction; means united with said movable means for movement therewith to grip the tape means on the return movement of the movable means thereby to advance the tape means to position a new portion of the tape means at the writing zone; and means operatively coupled to said movable means to prevent the movable means from moving in either of the first and second directions upon an advance of the movable means in the opposite one of the first and second directions to a position intermediate the starting and final positions.

11. In a register of the character described for recording data on tape means, the combination of: means operatively coupled to said tape means to extend said tape means longitudinally along a writing zone to receive data at the zone; a plurality of code members positioned transversely of said writing zone and having spaced code writing means thereon, said code members being adjustable from a starting position across the writing zone to position the code writing means selectively at the writing zone; a carriage; means operatively coupled to said carriage and to said code members and responsive to the adjustment of at least one of the code members from the starting position across the code writing zone to move said carriage from a starting position at one end of the writing zone along the length of the writing zone and to return the carriage to the starting position; control means on said carriage to cause said code writing means to record on said tape means, said control means being mounted on the carriage to shift towards and away from the tape means in the writing zone; and means responsive to reciprocation of the carriage to shift said causing means towards the tape means on the printing stroke of the carriage and to retract the causing means from the tape means on the return movement of the carriage.

12. A combination as set forth in claim 11 which includes a mechanism carried by the carriage for shifting the control means towards and away from the tape means; and which includes fixed means at the two ends of the range of movement of the carriage for cooperation with said mechanism to actuate the mechanism in response to reciprocation of the carriage.

13. In a register for recording data on record means, the combination of: means operatively coupled to said record means for extending the record means along a writing zone to receive data at the zone; a plurality of code members movable from normal starting positions along predetermined paths across the writing zone transversely thereof, said code members having code writing elements spaced apart in the directions of said paths for selective positioning at the writing zone by selective advance of the code members across the writing zone, said code writing elements representing different data values, each of said code members having two laterally spaced longitudinal legs with said code writing elements spaced along the outer edge of one leg; two guide means providing guide grooves in sliding engagement with the inner edges of the two legs of each code member; latch means operatively coupled to said code members to releasably hold said code members at the selected positions to which they may be advanced; and a plurality of coil springs corresponding to said code members for urging the code members toward their normal starting positions, each of said coil springs lying between the two legs of each code member and being substantially co-extensive with the two legs.

14. In a register for recording data on record means, the combination of: means operatively coupled to said record means for extending said record means along a writing zone to receive data at the zone; a plurality of code members movable from normal starting positions along predetermined paths across the writing zone transversely thereof, said code members having code writing means spaced apart in the directions of said paths for selective positioning at the writing zone by selective advance of the code members across the writing zone, said code writing means representing different data values, each of said code members having two laterally spaced longitudinal legs providing four longitudinal edges; said code writing means being spaced along a first one of said four longitudinal edges, a second of said four longitudinal edges being formed with ratchet teeth; two guide means in guiding engagement with the third and fourth longitudinal edges of each of said code members; pawl means to releasably engage said ratchet teeth; a plurality of coil springs corresponding to said code members for urging the code members towards their normal starting positions, each of said coil springs extending along substantially the same longitudinal region as the two legs of the corresponding code member at the starting position of the code member; and recording means operable at said writing zone to cause the code writing means at the writing zone to record on said tape means.

15. The combination as set forth in claim 14 in which said first and second edges of said four longitudinal edges are outer edges and said third and fourth edges are inner edges; and in which said springs lie between the two legs of each code member.

16. In a register of the character described for recording data on tape means, the combination of: means including reels to direct said tape means through a writing zone; a plurality of code members having spaced code writing elements thereon, said members being manually adjustable across said zone to place said elements in the zone selectively; means movable along said zone and operatively coupled to the code members to apply said elements to the tape means for a writing operation; actuating means operatively coupled to said movable means to cause said movable means to traverse said zone in a first direction from a starting position at one end of the zone to a final position at the opposite end of the zone for a writing operation and then to return in the opposite direction to the starting position from the final position; means operatively coupled to said reels both to advance said tape means and to actuate said reels to wind up the tape means in response to the return movement of said movable means; and means operatively coupled to said actuating means for preventing the movable means from traversing the zone in either the first or opposite directions upon an initial movement of the movable means in the other direction to a position intermediate the starting and final positions.

17. In a register of the character described for recording on tape means data provided on an input code member, the combination of: means to direct said tape means through a writing zone; means for receiving the input code member; a plurality of code members having spaced code writing elements thereon, said members being adjustable across said zone to place said elements in the zone selectively; movable means operatively coupled to the code members to traverse said zone and to provide for the recording on the tape means of the data on the code writing elements and the data represented by the adjustments of such elements; actuating means operatively coupled to said movable means to advance said movable means across said zone in one direction in pressure contact with the tape means to apply said elements to the tape means for the recording of the data represented by the adjustments of such elements and to return the movable means out of pressure contact with the tape means; means operatively coupled to the movable means and to the receiving means to provide for the traversing of the zone by the movable means only upon the application of the input code member to the receiving means; and means movable with said movable means to grip and advance the tape means in response to the return movement of the movable means.

18. A combination as set forth in claim 17 which includes reel means for said tape means and cable means to actuate the reel means; and in which one-way clutch means operatively connect said cable means with the reel means.

19. In a register of the character described for recording data on tape means, the combination of: means including reels disposed relative to said tape means to direct said tape means through a writing zone; a plurality of code members having spaced code writing elements thereon, said members being adjustable across said zone from a starting position to place said elements in the zone selectively; actuating means constructed to provide a given operating movement; means operatively coupled to said actuating means and responsive to an early portion of said operating movement, said responsive means being operable in said writing zone to apply said writing elements to the tape means for registering data thereon; means operatively coupled to said actuating means and responsive to a later portion of said actuating means to advance said tape means through said writing zone; and means operatively coupled to the code members and to the actuating means to prevent the given operating movement of the actuating means until the adjustment of at least one of the code members from the starting position.

20. A combination as set forth in claim 19 which includes reel means to direct said tape means through said writing zone; and which includes cable means operatively connecting said reel means with said actuating means.

21. In a register for recording data on record means, the combination of: means operatively coupled to said record means for extending said record means along a writing zone to receive data at the zone; a plurality of code members movable from normal starting positions along predetermined paths across the writing zone, said code members having spaced code writing elements thereon for selective positioning at the writing zone by selective movement of the code members from a starting position; a carriage; movable means operatively coupled to the carriage to move said carriage in one direction across the writing zone and to return the carriage in the opposite direction; means mounted on said carriage for shift relative to the carriage from an ineffective position to an effective position to create pressure between said record means and said code members for applying the selected code writing elements to the record means; means operatively coupled to said pressure-creating means to shift said pressure-creating means to its effective position when the carriage moves in said one direction and to retract the pressure-creating means to its ineffetcive position when the carriage moves to its return direction; and means operatively coupled to said movable means and to the code members for preventing the movement of the carriage by the movable means until the selective movement of at least one of the code members from the starting position.

22. A combination as set forth in claim 21 in which said means to shift the pressure-creating means between its two effective positions includes fixed means in the path of movement of the carriage and further includes actuating means on the carriage operable by movement against said fixed means.

23. A combination as set forth in claim 21 which includes track means for said carriage and in which said track means is mounted on spring means to create writing pressure in cooperation with said pressure-creating means.

24. In a register of the character described for recording on tape means data from an input code member, the combination of: means operatively coupled to said tape means for extending said tape means longitudinally along a writing zone to receive data at the zone; means for receiving the input code member; a plurality of code members having spaced code writing means thereon, said code members being adjustable across the writing zone from a starting position to position the code writing means selectively at the writing zone; a carriage; movable means operatively coupled to the carriage to move said carriage in one direction longitudinally of the writing zone and to return the carriage in the opposite direction; means mounted on said carriage for shift relative to the carriage from an ineffective position to an effective position to create pressure between said record means and said code members for applying to the tape means the data on the input code member and the data represented by the adjusted positioning of the selected code writing elements; means movable synchronously with the return movement of the carriage to grip said tape means on the return movement of the carriage for advance of the tape means; and means operatively coupled to the movable means and to the receiving means for preventing the movement of the carriage by the movable means until the application of the input code member to the receiving means.

25. A combination as set forth in claim 24 which includes means to prevent return movement of the carriage when the movement of the carriage in said one direction is incomplete and to prevent movement of the carriage in said one direction when the return movement of the carriage is incomplete, said preventing means being reversible in response to completion of the movement of the carriage in the two directions.

26. A combination as set forth in claim 24 which includes a manually operative reciprocating means for actuating said carriage; and which includes flexible means operatively connecting the carriage to said manual means.

27. A combination as set forth in claim 26 which includes reel means for said tape means and which includes flexible means operatively connecting said manual means with the reel means to take up the tape when the tape is advanced.

28. In a register of the character described for recording data on tape means, the combination of: means operatively coupled to said tape means for extending said tape means longitudinally along a writing zone to receive data at the zone; a plurality of code members having spaced code writing means thereon, said code members being adjustable across the writing zone to position the code writing means selectively at the writing zone; a carriage; manually reciprocative means operatively coupled to the carriage to move said carriage in a first direction across the writing zone and to return the carriage in a second direction opposite to the first direction; means mounted on said carriage for shift relative to the carriage from an ineffective position to an effective position to create pressure between said tape means and said code members for applying the selected code writing elements to the tape means; means movable synchronously with the return movement of the carriage to grip said tape means on the return movement of the carriage for advance of the tape means; reel means for said tape means including at least one frictionally retarded supply reel and at least one take-up reel; means responsive to said manual means for actuating said take-up reel on the return movement of the carriage; and means operatively coupled to said manually reciprocative means to prevent the manually reciprocative means from moving the carriage in either of the first or the second directions during the movement of the carriage in the other one of the first and second directions across the writing zone.

29. In a register of the character described for recording on tape means data in a first plurality of portions on an input code member, the combination of: means operatively coupled to said tape means for extending said tape means longitudinally along a longitudinal writing zone to receive data at the zone; first and second pluralities of code members movable from normal starting positions along predetermined paths across the writing zone, the number of code members in the first plurality corresponding to the number of portions in the first plurality on the input code member, said code members having spaced code writing elements for selective positioning at the writing zone by selective advance of the code members across the writing zone; means for receiving the code input member; the code members of said first plurality being disposed relative to said receiving means to cause the code members of the first plurality to advance to predetermined positions across said writing zone in response to application of the code input member to the receiving means and in accordance with the data on the first plurality of code members; a plurality of manually operable keys corresponding to said second plurality of code members to advance the code members of the second plurality to selected positions; a carriage; manually reciprocative means operatively coupled to the carriage to move said carriage in one direction from a starting position across said zone and return the carriage in the opposite direction; means operatively coupled to said carriage to advance said tape means in response to the return movement of the carriage; and latch means operatively coupled to said carriage to prevent movement of the carriage from its starting position, said latch means being releasable in response to application of said code input member to the receiving means.

30. In a register of the character described for recording on tape means data in a first plurality of portions on an input code member, the combination of: means operatively coupled to said tape means for extending said tape means longitudinally along a longitudinal writing zone to receive data at the zone; first and second pluralities of code members movable from normal starting positions along predetermined paths across the writing zone, the number of code members in the first plurality corresponding to the number of portions in the first plurality on the input code member, said code members having spaced code-writing elements for selective positioning at the writing zone by selective advance of the code members across the writing zone; means for receiving the code input member; the code members of said first plurality being disposed relative to said receiving means to cause the code members of the first plurality to advance to predetermined positions across said writing zone in response to application of the code input member to the receiving means and in accordance with the data on the first plurality of portions on the code input member; a plurality of manually operable keys corresponding to said second plurality of code members to advance the code members of the second plurality to selected positions; a carriage; manually reciprocative means operatively coupled to said carriage to move said carriage in one direction from a starting position across said zone and to return the carriage in the opposite direction; means operatively coupled to said carriage to advance said tape means in response to the return movement of the carriage; and latch means operatively coupled to said carriage to prevent movement of said carriage from its starting position, said latch means being responsive to said code input member and said keys to release only when the code input member is applied to the register and at least one of said keys is operated.

31. In a register for recording on second means data in a first plurality of portions on first and second input code members, the combination of: means operatively coupled to said record means for extending said record means along a writing zone to receive data at the writing zone; first and second pluralities of code members movable from normal starting positions along predetermined paths across the writing zone, the number of code members in the first plurality corresponding to the number of portions in the first plurality on the first and second input code members; said code members having spaced code writing elements for selective positioning at the writing zone by selected advance by the code members across the writing zone; first means for receiving the first code input member, code members of said first plurality being disposed relative to said first receiving means to cause the code members of the first plurality to advance to predetermined positions across said writing zone in response to application of the first code input member to the first receiving means; means for receiving the second code input member, the code members of said second plurality being disposed relative to the second receiving means to cause the code members of the second plurality to advance to predetermined positions across said writing zone in response to application of the second code input member to the second receiving means; a writing mechanism operative to apply the selected code writing elements at the writing zone to said record means for recording data thereon; and latch means operatively coupled to said writing mechanism to prevent operation of said writing mechanism, said latch means being disposed relative to said first and second receiving means and being responsive to release only when both code input members are respectively applied to the first and second receiving means.

32. A combination as set forth in claim 31 which includes: spring means to actuate the release operation of said latch means from a cocked position of the latch means; and which includes means to cock said latch mechanism in response to the completion of the operation of said writing mechanism.

33. A combination as set forth in claim 31 which includes a third plurality of code members; which includes a plurality of manually operable keys corresponding to said third plurality of code members to advance the code members of the third plurality to selected positions; and in which said latch means is responsive to said keys as well as to said first and second code input members to release only when at least one of said keys is operated and both of said code input members are applied to the register.

34. The combination set forth in claim 3, including, means operatively coupled to the applying means and to the code members for preventing the applying means from applying the writing elements of the code members to the tape means until the selective advance of at least one of the code members from the starting position.

35. The combination set forth in claim 24, including, means operatively coupled to the movable means and the code members for preventing the movement of the carriage by the movable means until the selective adjustment of at least one of the code members from the starting position.

36. Means for recording data, comprising:

a plurality of code members movable from normal starting positions along predetermined paths, with the paths intersecting a writing zone extending transversely of the paths, said code members having spaced code writing elements distributed longitudinally thereof for selective positioning at the writing zone;

an input code member of a width to intersect said paths and having longitudinal portions corresponding to the paths respectively;

means to receive said input member and to guide the input member to a predetermined recording position to cause said longitudinal portions to move longitudinally adjacent the paths in the same direction as the paths;

and projections on said input member positioned along said longitudinal portions in accord with given values to be written in said writing zone to engage and shift said code members to place in said writing zone writing elements of the code members corresponding to said given values.

37. A combination as set forth in claim 36, in which said code input member is a sheet member and said projections are offset portions of the sheet member.

References Cited in the file of this patent

UNITED STATES PATENTS

| | | |
|---|---|---|
| 2,016,682 | Mills | Oct. 8, 1935 |
| 2,281,577 | Haynes | May 5, 1942 |
| 2,599,709 | Griesinger | June 10, 1952 |
| 2,647,459 | Murphy | Aug. 4, 1953 |
| 2,686,469 | Toggenburger | Aug. 17, 1954 |
| 2,884,857 | Schwinn | May 5, 1959 |